United States Patent [19]

Yamamoto et al.

[11] Patent Number: 5,090,081
[45] Date of Patent: Feb. 25, 1992

[54] WINDSHIELD WIPER WITH VARIABLE ARCUATE PATTERN

[75] Inventors: Tokihiko Yamamoto, Kariya; Ryoichi Fukumoto, Nagoya; Masao Ohhashi, Kariya; Kazuhide Itagaki, Toyota; Kazuhiro Sumiya, Hekinan, all of Japan

[73] Assignee: Aisin Seiki Kabushiki Kaisha, Japan

[21] Appl. No.: 581,348

[22] Filed: Sep. 12, 1990

[30] Foreign Application Priority Data

Sep. 29, 1989 [JP] Japan .................. 1-252044

[51] Int. Cl.⁵ .............................. B60S 1/04; B60S 1/06
[52] U.S. Cl. ............................ 15/250.13; 15/250.16; 74/571; 74/42; 74/522; 74/835
[58] Field of Search ........... 15/250.13, 250.30, 250.16, 15/250.17; 74/571 L, 571 R, 42, 522, 835, 836

[56]  References Cited

U.S. PATENT DOCUMENTS

| | | | |
|---|---|---|---|
| 2,713,178 | 7/1955 | Stocks | 15/250.3 |
| 2,739,681 | 3/1956 | Bowers et al. | 15/250.16 |
| 3,025,552 | 3/1962 | Content | 15/250.16 |
| 3,025,554 | 3/1962 | Ziegler | 15/250.17 |
| 3,282,120 | 11/1966 | Compton | 15/250.13 |
| 3,422,480 | 1/1969 | Kato | 15/250.3 |
| 3,729,766 | 5/1973 | Buchanan, Jr. | 15/250.30 |
| 4,466,153 | 8/1984 | Seibicke | 15/250.16 |
| 4,494,421 | 1/1985 | Matuoka | 15/250.17 |
| 4,686,733 | 8/1987 | Sahara | 15/250.16 |

FOREIGN PATENT DOCUMENTS

| | | | |
|---|---|---|---|
| 3607704 | 9/1986 | Fed. Rep. of Germany | 15/250.13 |
| 3829939 | 3/1989 | Fed. Rep. of Germany | 15/250.13 |
| 411012 | 6/1945 | Italy | 15/250.16 |
| 78850 | 4/1988 | Japan | 15/250.13 |
| 141148 | 6/1989 | Japan | 15/250.13 |
| 516232 | 12/1939 | United Kingdom | 15/250.13 |

Primary Examiner—Harvey C. Hornsby
Assistant Examiner—Gary K. Graham
Attorney, Agent, or Firm—Finnegan, Henderson Farabow, Garrett & Dunner

[57]  ABSTRACT

A windshield wiper includes a first pin connected to a drive mechanism, a primary lever supported by the first pin, a second pin mounted to the primary pin, a wiper arm fixedly mounted to the second pin, the primary lever being rotated about the second pin by the drive mechanism to cause reciprocating motion of the wiper arm in an arcuate path, a first cam member rotatable about the first pin, a second cam member rotatable about the second pin, and a secondary lever for connecting the first cam member and the second cam member together. The second cam member is so rotated as to allow a center of the first cam member to move relative to a center of the first pin, thereby changing the effective length of the primary lever such that the arcuate path of the wiper arm is changed. A wheel gear is used to rotate the second cam member through a predetermined angle. The second cam member is rotatably supported by a stationary member. A gear portion is meshed with the wheel gear and rotated by the motor. The wheel gear and the gear portion are both housed in a casing which is, in turn, fixed to the stationary member.

1 Claim, 27 Drawing Sheets

WINDSHIELD WIPER WITH VARIABLE ARCUATE PATTERN

BACKGROUND OF THE INVENTION

1. Field of the Invention

The present invention relates to a windshield wiper in which the included angle between inboard and outboard positions or the operative sweep of the wiper can be changed, and more particularly to a wiper system including a compact motor fixed to a stationary member and operable to vary the operative sweep of the wiper.

2. Description of the Related Art

It is well known to vary the included angle between inboard and outboard positions of a windshield wiper. FIG. 35 shows the basic principle of varying the included angle between inboard and outboard positions of a wiper. An eccentric shaft 201 is driven for rotation by a motor. A crankshaft 202 is mounted to the eccentric shaft 201 and selectively movable relative thereto. A crank lever 203 has one end fixed to the crankshaft 202. The other end of the crank lever 203 is pivotally connected to one end of a rod 204. The other end of the rod 104 is pivotally connected to a free end of an arm 207 which is, in turn, fixedly mounted to a pin 205. The pin 205 is rotatably supported by a stationary member and is adapted to carry a wiper arm 206.

When the center of the crankshaft 202 is positioned, as indicated by the circle 202', relative to the center of the center of the eccentric shaft 201, the other end of the crank lever 203 is rotated about the axis of the eccentric shaft 201 as shown by the double circle 203'. At this time, the arm 207 is rotated about the pin 205 through a predetermined angle. In order to place a wiper blade (not shown) in its depressed park or stowed position, the crankshaft 202 is moved relative to the eccentric shaft 201 in such a manner that its center is displaced as indicated by the triangle 202". As a result, the other end of the crank lever 203 is moved toward the axis of the eccentric shaft 201 as shown by the triangle 203". Also, the arm 207 is moved to its stowed position as shown by the triangle 207". The wiper arm 206 can be moved to the stowed position below the inboard position by displacing the crankshaft 202 relative to the eccentric shaft 201.

The wiper arm is oscillated back and forth to wipe, for example, a windshield when the vehicle is not only stopped, but also runs at any speed. While the vehicle is running, the force of wind is exerted on the wiper arm 206. This causes the wiper arm 206 to move beyond a predetermined position and thus, increases a predetermined arcuate path along which the wiper arm 206 is moved. Such undesirable movement of the wiper arm 206 results in the damage of a wiper blade due to contact with a piller. If the wiper blade is moved beyond the piller, then it becomes even inoperative.

The force of wind increases through the arm 207, the crank lever 203 and the rod 204, and then acts on the motor. To this end, a large worm is required to counteract such a force. This results in an increase in the size of the overall wiper system.

For the foregoing reasons, the prior art wiper drive mechanism is large, and the wiper is subject to damage.

Accordingly, it is an object of the present invention to provide a windshield wiper which overcomes the foregoing problems encountered in the prior art.

SUMMARY OF THE INVENTION

In order to overcome the foregoing problems, a wiper according to the present invention comprises a primary lever on which a second pin is supported to carry a wiper arm, a secondary lever connected to the primary lever by cam members, one being rotated about a first pin and the other being rotated about a second pin. With this arrangement, the second cam member is rotated to allow relative movement of the center of the first cam member and the center of the second pin.

When the second cam member is rotated, then the angular movement of the second cam member is transmitted to the first cam member. This causes the center of the first cam member to be displaced relative to the center of the first pin or the second pin. A force is applied from the drive unit to the first cam member. This result in the change of the operating point and thus adjusts the angular position of the wiper arm.

With now reference to FIG. 1, a primary lever 9 has a first pin 16 and a second pin 2. A secondary lever 25 is connected to the primary lever 9 through a first cam member 26 and a second cam member 24. When a point at which the second cam member 24 and the secondary lever 25 are connected is located as at A, an operating point (or center of the first cam member) at which a force is applied to the first cam member 26 is located as at A'. This arrangement allows the wiper to oscillate through a long running arc. When the second cam member 24 is rotated to cause the point at which the second cam member 24 and the secondary lever 25 are connected to move to a point B, the operating point is correspondingly moved to a point B'. Then, the wiper is placed in its stowed position. When the point at which the second cam member 24 and the secondary lever 25 is moved to a point C, then the operating point is displaced to a point C'. The wiper is then oscillated through a short running stroke or the operative sweep of the wiper has a short arc.

According to the present invention, only the second cam member is rotated. This allows the use of a compact motor and results in an decrease in the size of the overall wiper system.

A force is applied from a drive unit to the center of the first cam member 26. To this end, a worm is fixed to the compact motor to prevent the second cam member to rotate about the second pin 2. Accordingly, a wiping mode of operation is properly maintained. It will be noted that a more compact motor may be used if the direction in which a force is applied by the drive unit is synchronized with the direction in which a drive force is supplied by the motor.

In the present invention, the motor, the worm, and worm wheel are all housed in a casing. When the casing is fixedly mounted to the stationary member, the wheel gear is engaged with the second cam member. This allows the second cam member to rotate through a predetermined angle.

BRIEF DESCRIPTION OF THE DRAWINGS

A better understanding of the present invention may be had by reference to the following description of preferred embodiment when taken in conjunction with the accompanying drawings, in which.

DESCRIPTION OF THE PREFERRED EMBODIMENTS

Figure 2:
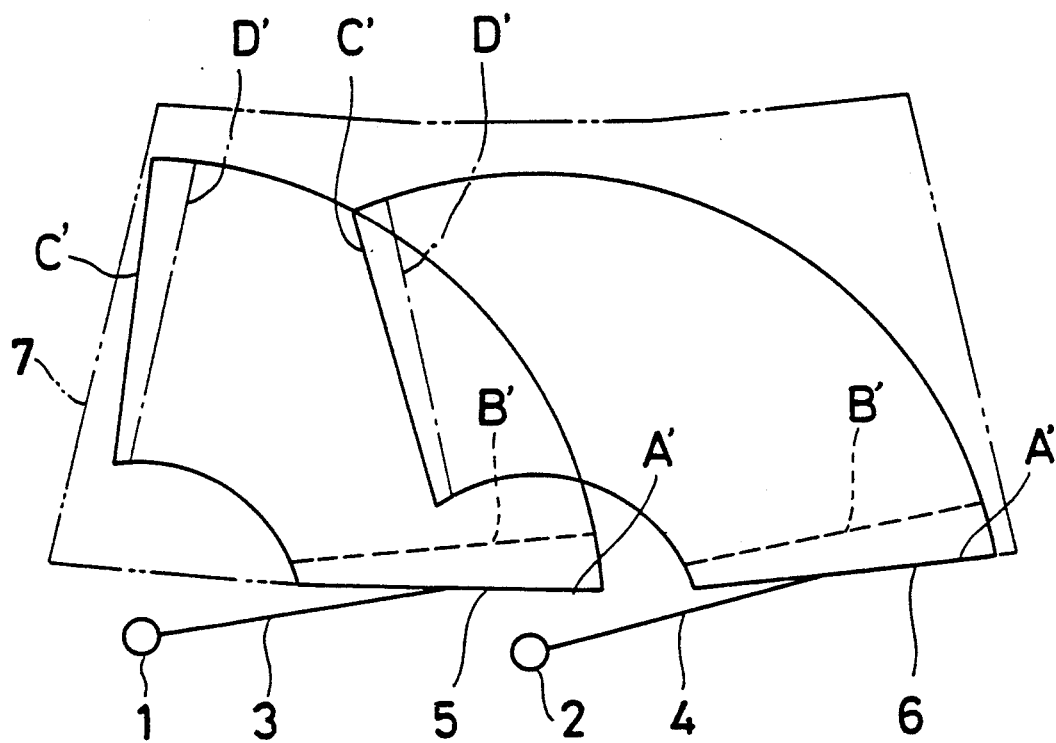
FIG. 2 is a schematic view showing the operative sweep of the wipers.
Figure 3:
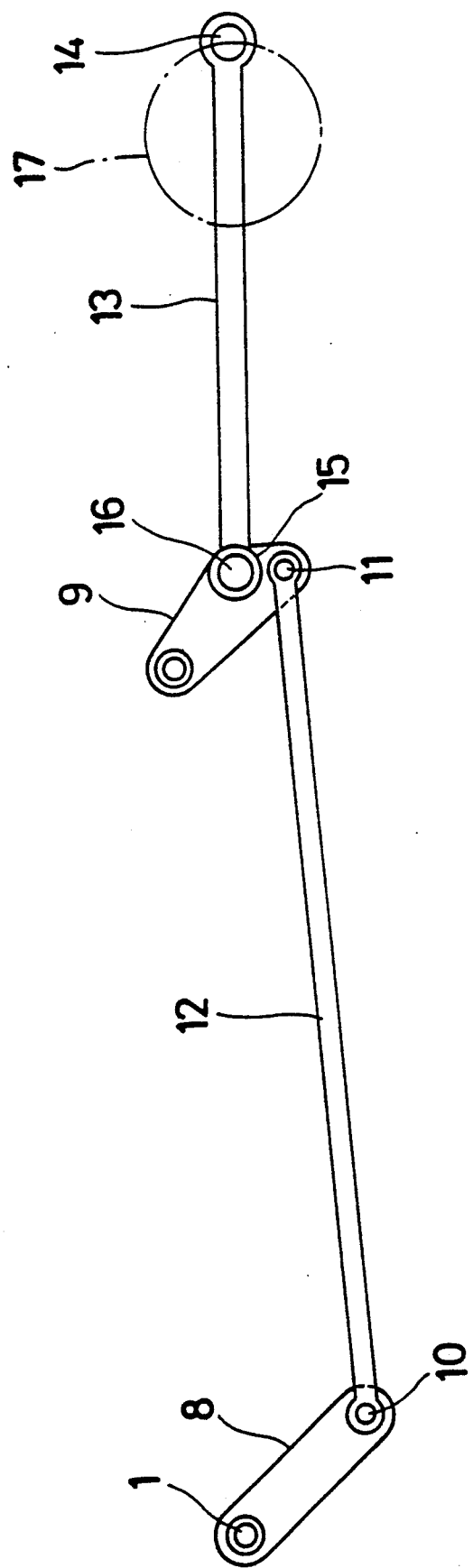
FIG. 3 is a schematic view of a link mechanism of the wiper.

The basic arrangement of each wiper is schematically illustrated in FIGS. 2 and 3. The wipers include second wiper shafts or pins 1 and 2 to which wiper arms 3 and 4 are fixedly mounted. The wiper arms 3 and 4 carry wiper blades 5 and 6 at their one end, respectively. When the wipers are not in operation, the wiper blades 5 and 6 are in their parked or stowed position. When in operation, the wiper blades 5 and 6 are moved to their inboard position. The reference numeral C' indicates an outboard extreme of wipe when the wiper blades are oscillated through a long running stroke or the operative sweep of the wiper blades has a long arc. The reference numeral D' indicates an outboard extreme of wipe when the wiper blades are oscillated through a short running stroke or the operative sweep of the wiper blades has a short arc. The wipers are oscillated through a long running stroke (between the points B' and C') only when both the vehicle and the wiper blades travel at a low speed. The wipers are oscillated through a short running stroke (between the points B' and D') under any other circumstances. In other words, the operative sweep of the wiper blades has a short arc when the vehicle runs at high speeds or when the vehicle runs at a low speed, and the wipers travel at a high speed. It should be understood that the inboard extreme or point B' of each of the wiper blades may be a stowed position. The reference numeral 7 indicates a pillar. The second pins 1 and 2 are fixedly mounted to primary levers 8 and 9, respectively. The primary levers 8 and 9 have respective shafts 10 and 11 between which a link 12 extends to interconnect the both primary levers 8 and 9. One (9) of the primary levers has a pin 16 by which a connecting portion 15 is pivotally supported. A link 13 is connected to a connecting portion 15 and also, a motor. One end 14 of the link 13 is thereby moved through a circular path as at 17. The motor is operable to cause reciprocating motion of the link 13. This causes the primary levers 8 and 9 to pivot about the second pins 1 and 2. Since the second pins 1 and 2 are fixedly mounted to the primary levers 8 and 9, the second pins 1 and 2 are also rotated to cause the wiper arms 3 and 4 to oscillate through a given running stroke. Reference is made to a mechanism for varying the operative weep of the wipers. In the illustrated embodiment, such a mechanism is mounted to the primary lever 9. Alternatively, it may be mounted to the other primary lever 8. It should be understood that a single primary lever may be used.

Figure 4:
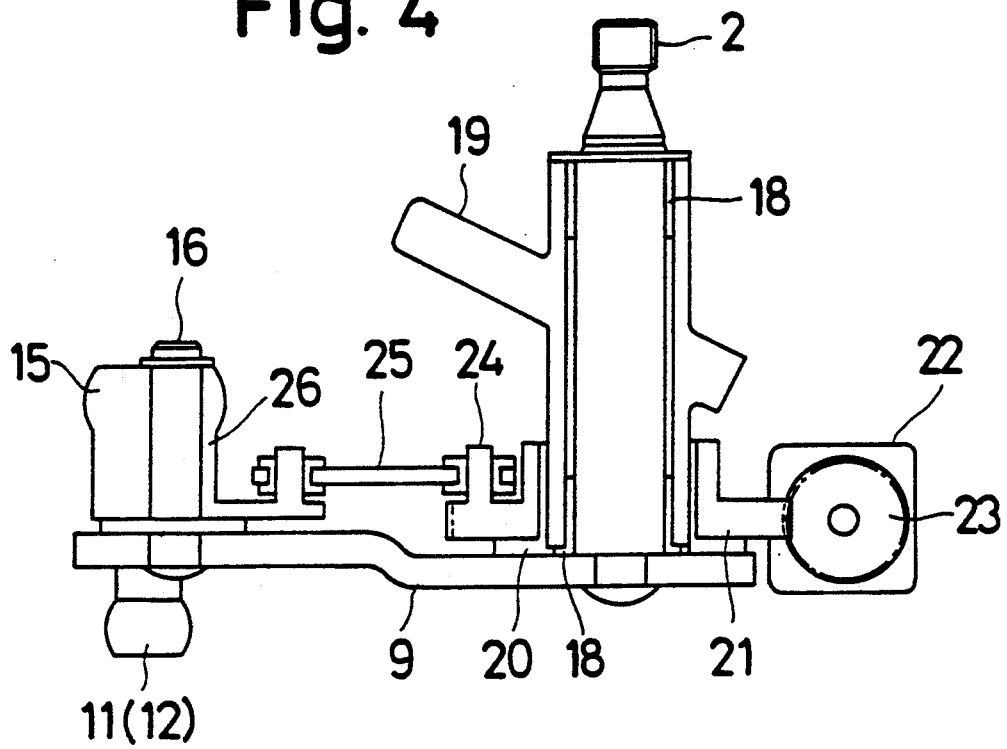
FIG. 4 is a sectional view of a mechanism for varying the operative sweep of the wiper according to a first embodiment of the present invention.
Figure 5:
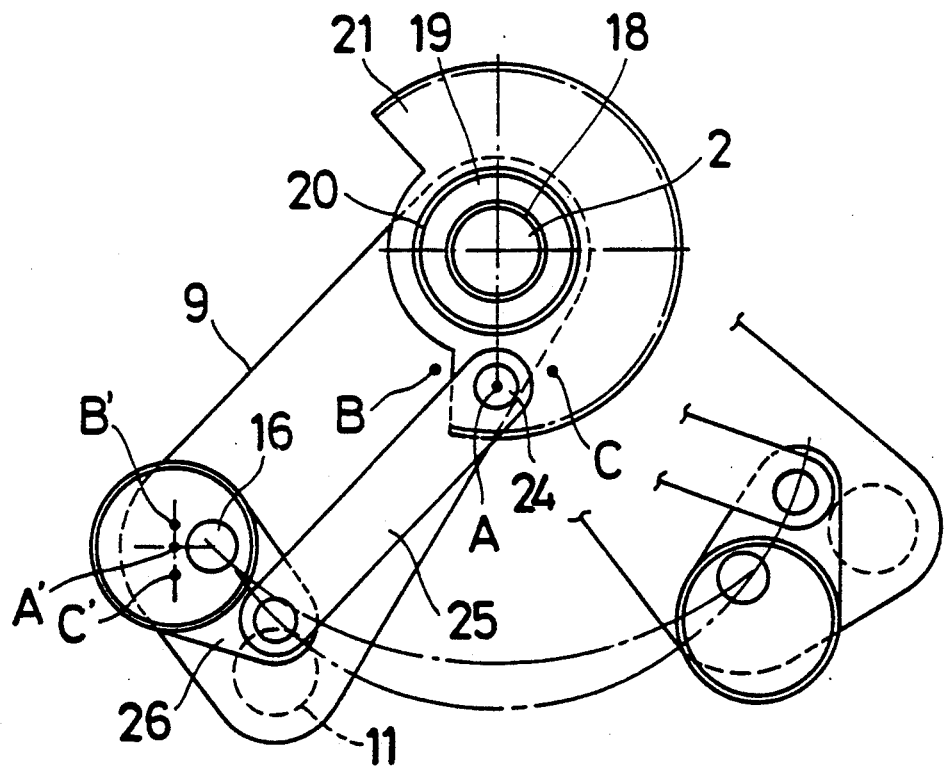
FIG. 5 is a plan view of the mechanism shown in FIG. 4.

With reference to FIGS. 4 and 5, the pin 2, as fixed to the primary lever 9, is rotatably supported by a stationary member 19 of the vehicle body through a bushing 18. A worm wheel 21 is also rotatably supported by the stationary member 19 through a bushing 20. A worm 23 is fixedly mounted to an output shaft of the motor 22 for meshing engagement with the worm wheel 21.

The worm wheel 21 has a second cam member 24 by which a secondary lever 25 is rotatably supported. The other end of the secondary lever 25 is rotatably supported by a first cam member 26 which is, in turn, supported on the primary pin 16.

Figure 1:
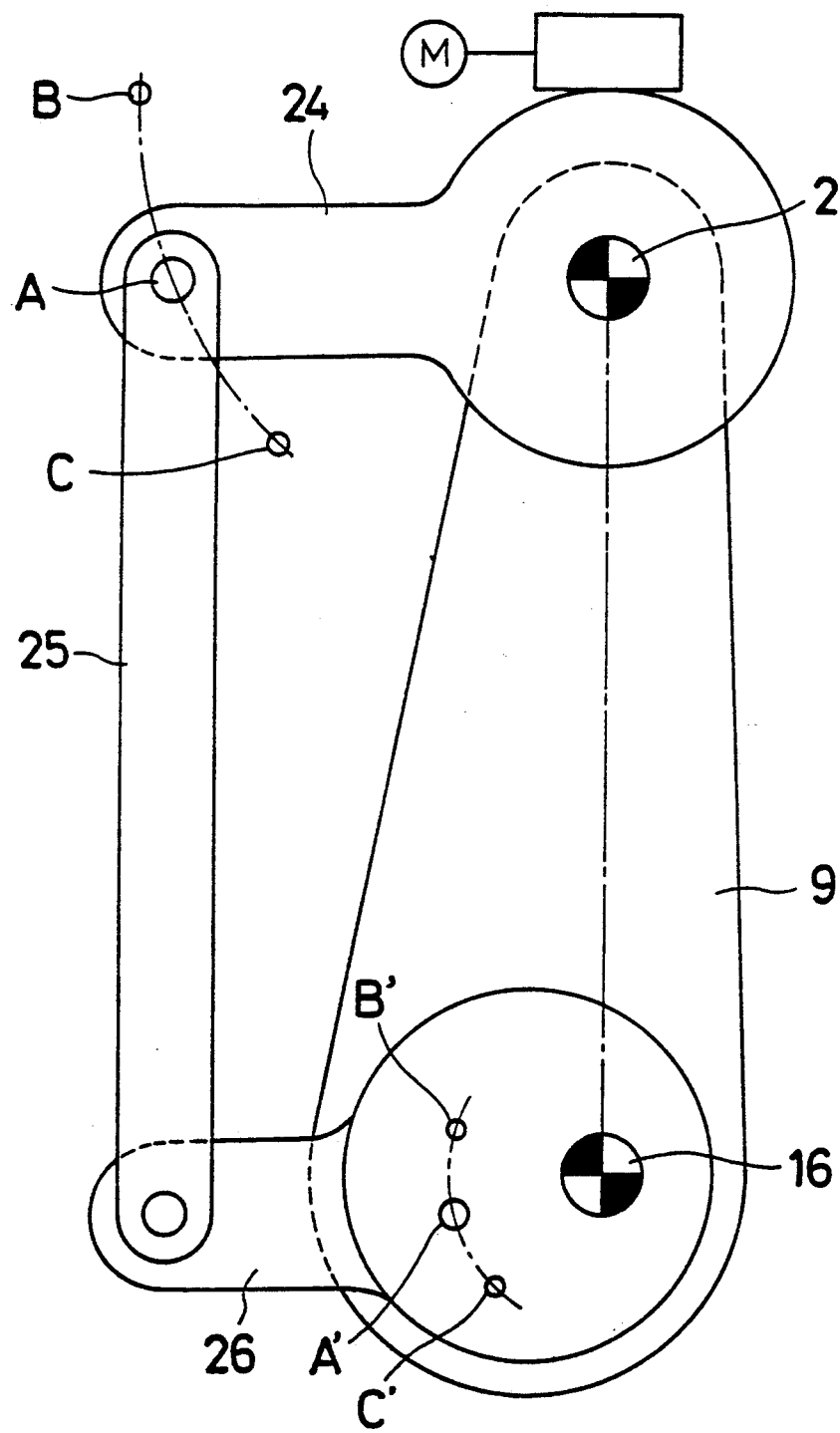
FIG. 1 is a schematic view showing the principle of a mechanism for varying the operative sweep of a wiper.

Upon energization of the motor 22, the worm 23 is rotated. This causes the worm wheel 21 to pivot about the pin 2. A point A at which the cam member 24 and the secondary lever 25 are connected together is then moved to either a point B or a point C. This causes a center A' of the first cam member 26 to angularly move about the axis of the pin 16 to either a point B' or a point C'. As explained with reference to FIG. 1, when the center of the first cam member 26 is located as at A', the operative sweep of the wiper has a long arc. When located as at B', the wiper is kept in its stowed position. When located as at C', the operative sweep of the wiper has a short arc.

In the illustrated embodiment, the distance between a point at which a force is applied from the link 13 (FIG. 3) to the connecting portion 15 and the central axis of the pin 16 is considerably less than the distance between the central axis of the pin 16 and a point at which the secondary lever 25 and the first cam member 26 are connected. By this arrangement, such a force as applied to the connecting portion 15 can be decreased until it is transmitted to the secondary lever 25. Thus, it have no effect on the teeth of the worm wheel 21.

Figure 6:
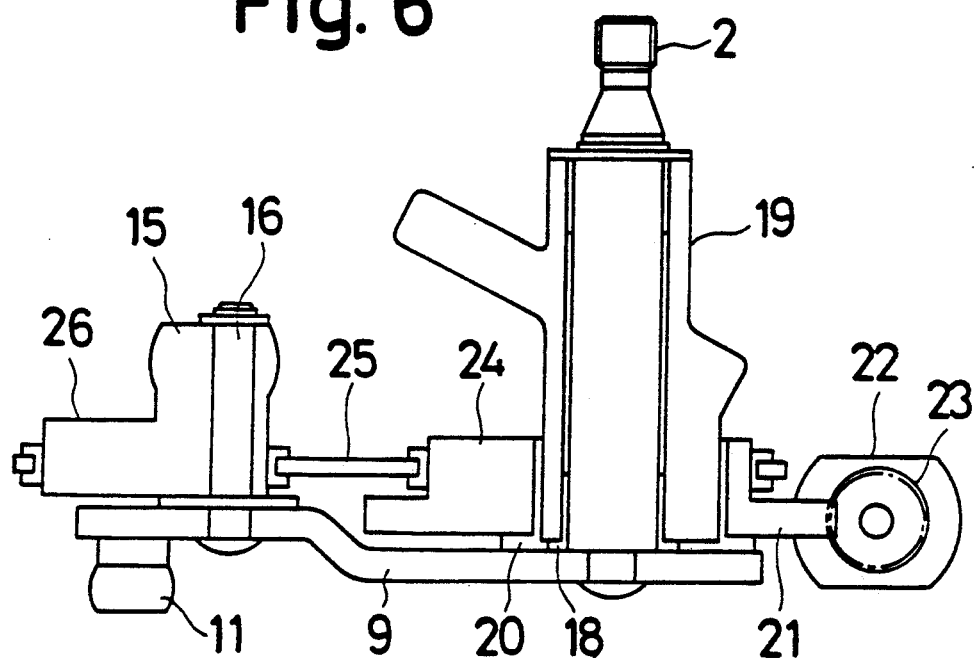
FIG. 6 is a sectional view of a mechanism for varying the operative sweep of the wiper according to a second embodiment of the present invention.
Figure 7:
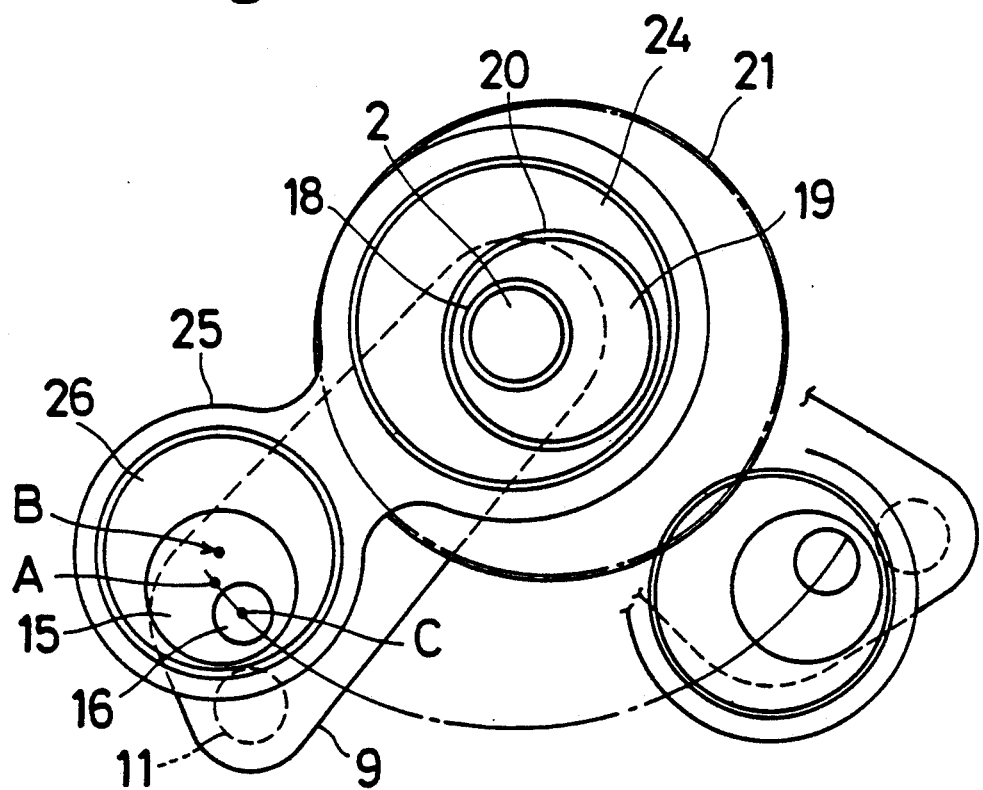
FIG. 7 is a plan view of the mechanism shown in FIG. 6.

FIGS. 6 and 7 show a second embodiment of the present invention. The second pin 2 is fixed to the primary lever 9. The second cam member 24 is rotatably mounted to the stationary member 19 which is in an eccentric relation to the second cam member 24. Therefore, the central axis of the pin 2, the axis of the stationary member 19, and the central axis of the second cam member 24 are in an eccentric relation to each other. The worm wheel 21 is integral with the second cam member 24 and engaged with the worm 23. The first pin 16 extends vertically and upwardly from the primary lever 9. The primary cam member 26 is rotatably mounted to the first pin 16. One end of the link 13 is carried by the connecting portion 15 which is located at the upper portion of the cam member 26. The central axis of the pin 16, the center of the first cam member 26 and the center of the connecting portion 26 are all in an eccentric relation to each other. Rotary motion of the worm wheel 21 is transmitted to the first cam member 26 through the second cam member 24 and the secondary lever 25. This causes the secondary lever 25 to rotate about the pin 16. As a result, a point at which a force is applied from the link 13 is moved to other points. As stated earlier, the wiper is oscillated through a long or short running stroke or is maintained in its stowed position depending on the points selected.

In this embodiment, a counterforce at the center of first cam member 26 can be small relative to a force applied from the link 13 to the connecting portion 15. This makes it possible to use a thinner secondary lever and reduces loads applied to a portion in which the worm wheel 21 and the worm 23 are in meshing engagement with one another. Also, as is clear from FIGS. 31 through 34, three points α, β and γ can be maintained at sufficient intervals. The distance between a point at which a force is applied from the secondary lever 25 and the central axis of the pin 16 is long enough, so that the motor may have a lesser power.

Figure 8:
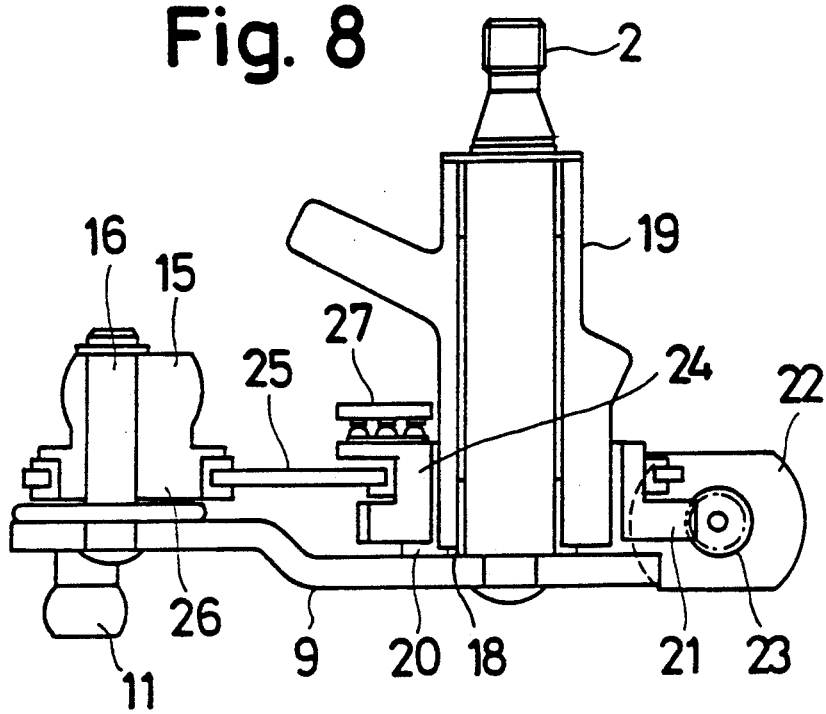
FIG. 8 is a sectional view of a mechanism for varying the operative sweep of the wiper according to a third embodiment of the present invention.
Figure 9:
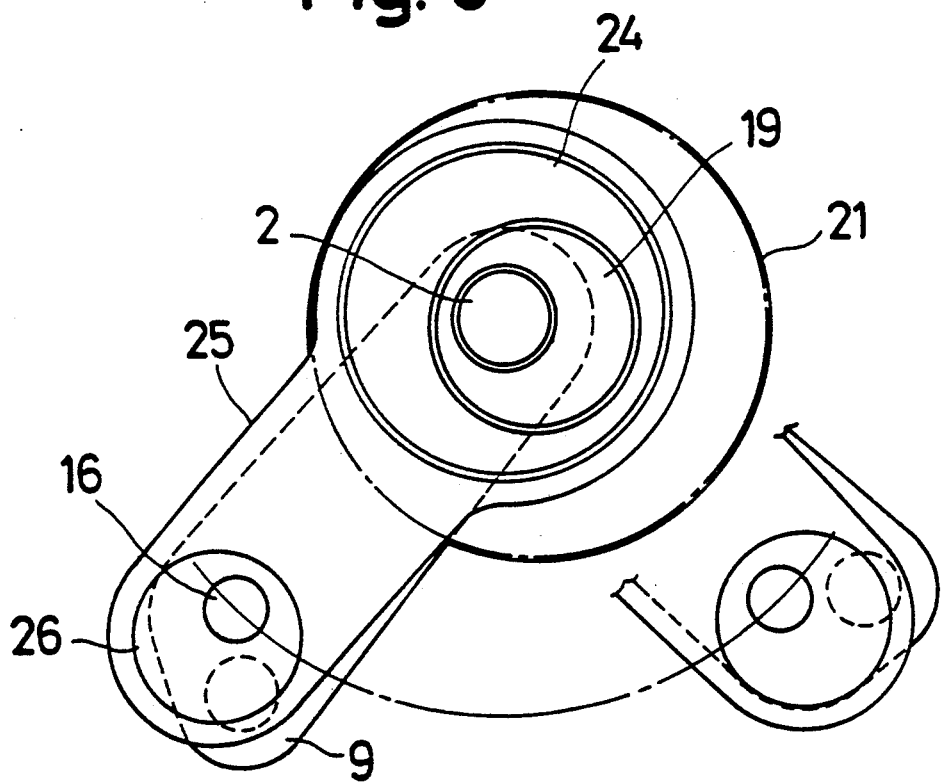
FIG. 9 is a plan view of the mechanism shown in FIG. 8.

FIGS. 8 and 9 show a third embodiment of the present invention. In the illustrated embodiment, the arrangement around the pin 2 is identical to that around the pin 12 shown in FIG. 6. Likewise, the arrangement around the pin 16 is identical to that around the pin 16 shown in FIG. 6. The reference numeral 27 indicates a sensor adapted to receive an electrical signal from a contact situated on the second cam member 24 so as to detect angular position of the second cam member 24. It should be understood that such a sensor may be used in any of the embodiments.

Figure 10:
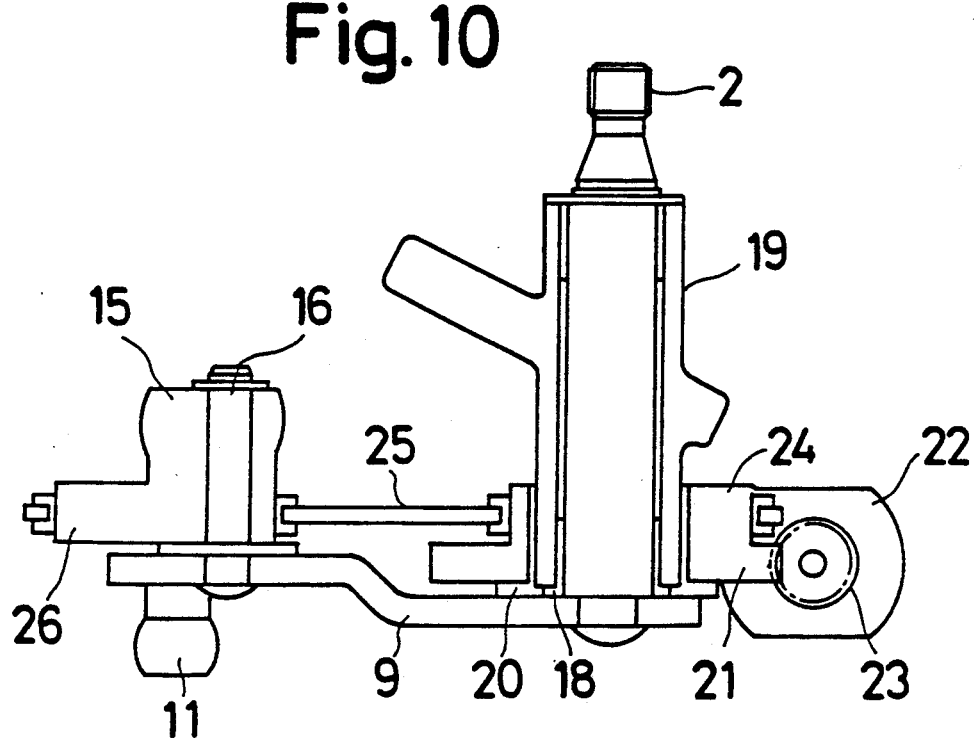
FIG. 10 is a sectional view of a mechanism for varying the operative sweep of the wiper according to a fourth embodiment of the present invention.
Figure 11:
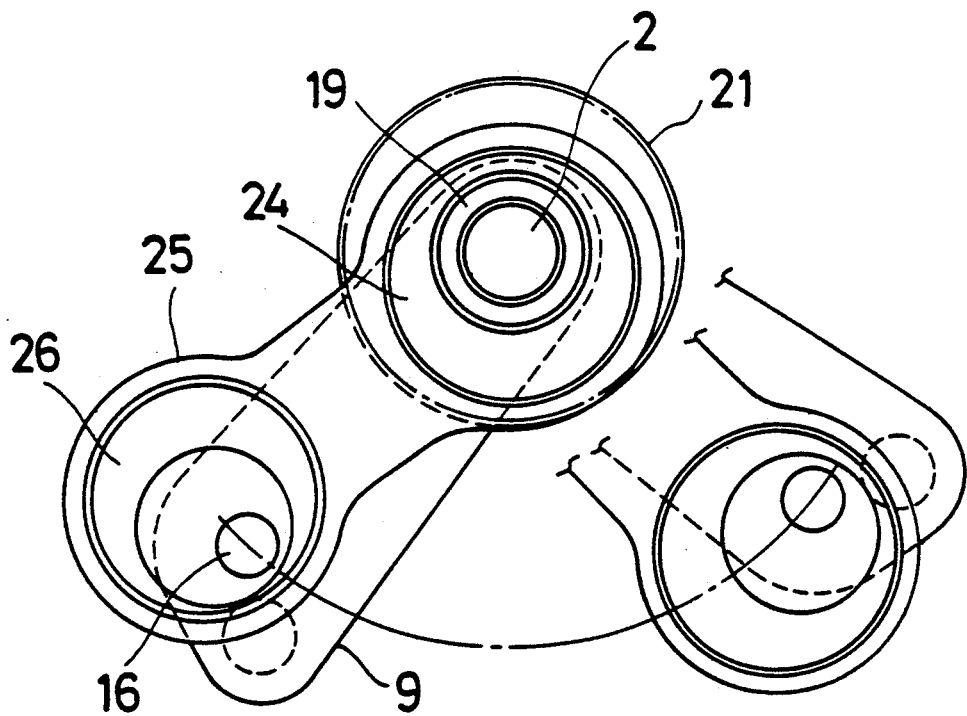
FIG. 11 is a plan view of the mechanism shown in FIG. 10.
Figure 12:
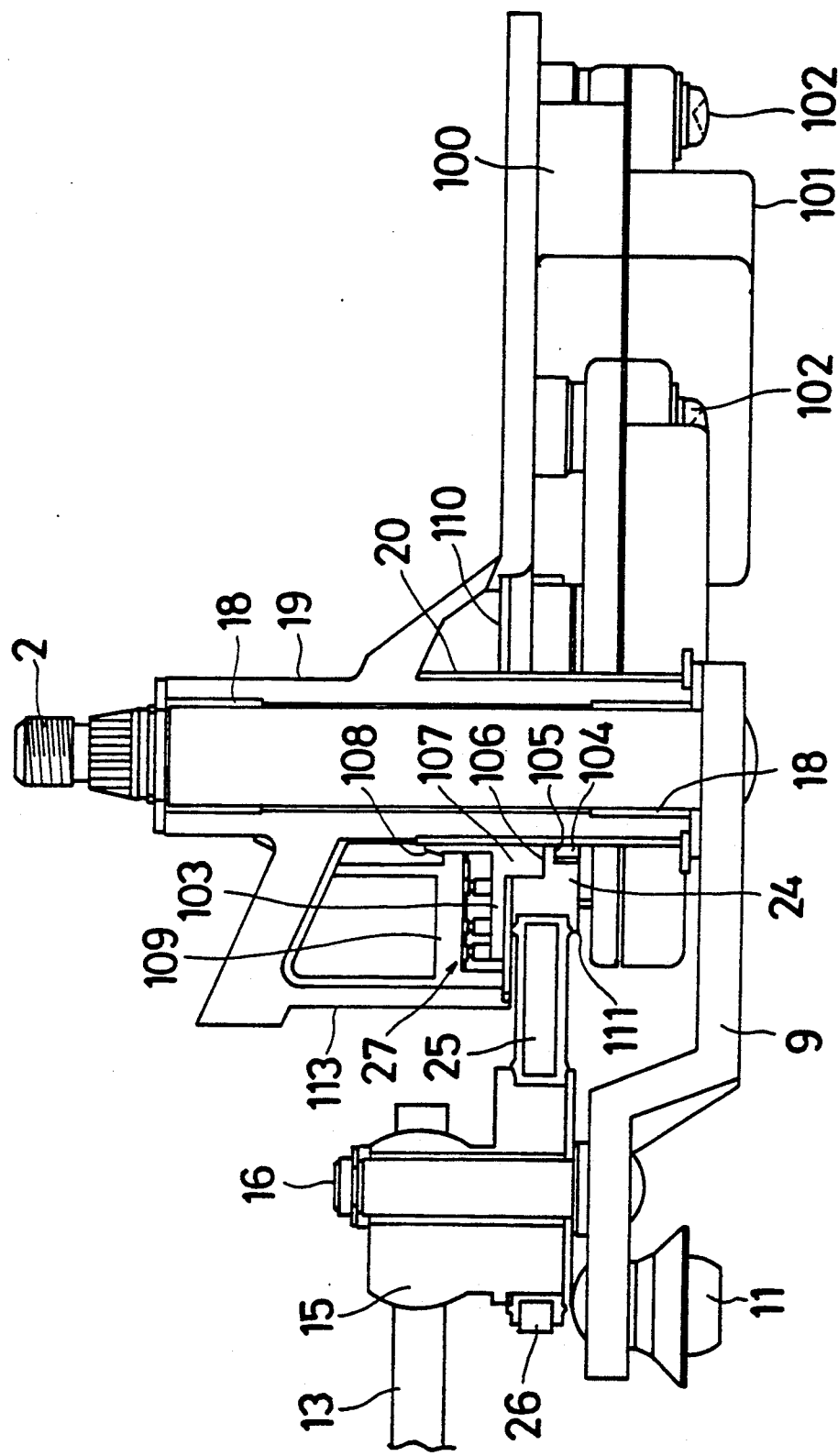
FIG. 12 is a sectional view of a mechanism for varying the operative sweep of the wiper according to a fifth embodiment of the present invention.
Figure 13:
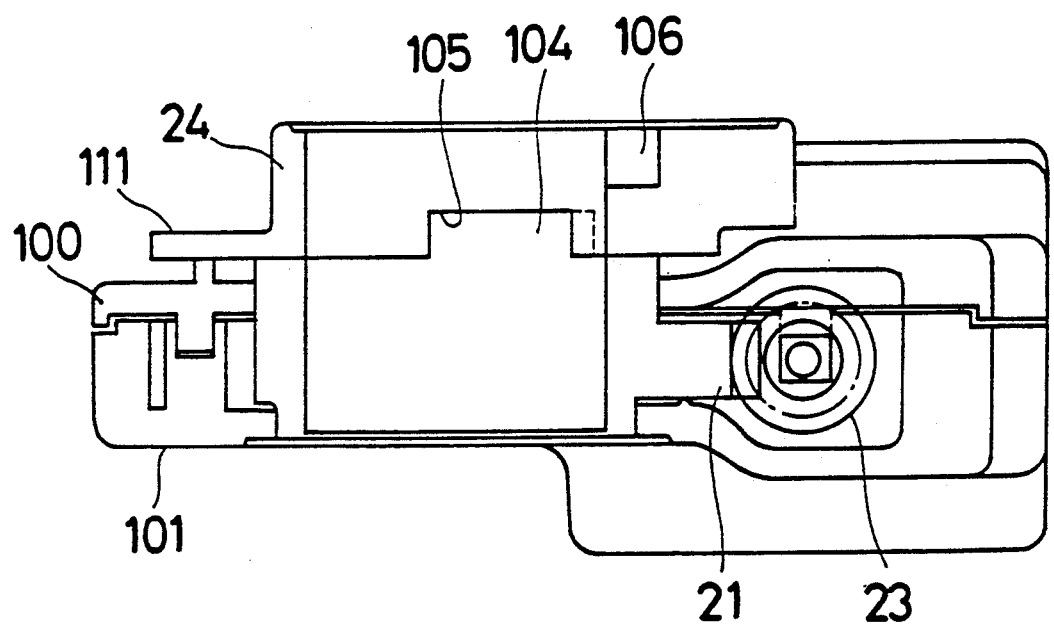
FIG. 13 is a sectional view of a worm wheel of the mechanism shown in FIG. 12.

FIGS. 10 and 11 show a fourth embodiment of the present invention. In the illustrated embodiment, the arrangement around the second pin is identical to that around the second pin shown in FIG. 2. Also, the arrangement around the first pin 16 is identical to that around the pin 16 shown in FIG. 6. Thus, no details will be given herein.

Although not shown, there may be combined the arrangement around the second pin shown in FIG. 4 and the arrangement around the first pin 16 shown in FIG. 6.

FIGS. 12 through 17 show a fifth embodiment of the present invention. The motor 22, the worm 23, the worm wheel 21 are all housed in a casing. The casing includes an upper section 100 and a lower section 101. The both sections 100 and 101 are coupled together by a plurality of screws 102 and secured to the stationary member 19. The stationary member has a cylindrical portion by which the worm wheel 21, the second cam member 24, and a movable portion 103 of the sensor 27 are all supported through the bushing 20.

The worm wheel 21 has a pair of projections 104 for engagement with a recess 105 of the second cam member 24. This arrangement allows the both components to rotate together. The second cam member 24 and the sensor 27 are coupled together upon engagement of a recess 106 with a projection 107. The sensor 27 has an engagement portion 108 extending upwardly from the movable portion 103 and rotatably supported by a fixed portion 109 of the stationary member 19. This arrangement ensures relative positioning between terminals in the fixed portion 109 and those in the movable portion 103 of the sensor 27 and prevents loosening or disengagement of the sensor 27 in the axial direction.

A plate 110 is disposed between the second cam member 24 and the movable portion 103 of the sensor 27. The plate 110 is subject to an axial force by the second cam member 24 and the secondary lever 25 and intended to protect the sensor 27. The position of the secondary lever 25 in the axial direction is determined by the plate 110 and a bearing surface 111 of the second cam member 24. The plate 110 per se is fixed to the stationary member 19 by screws 112. The stationary member 19 has a side wall 113 which cooperates with the plate 110 to surround the sensor 27 so as to protect the same from water or dust.

Figure 14:
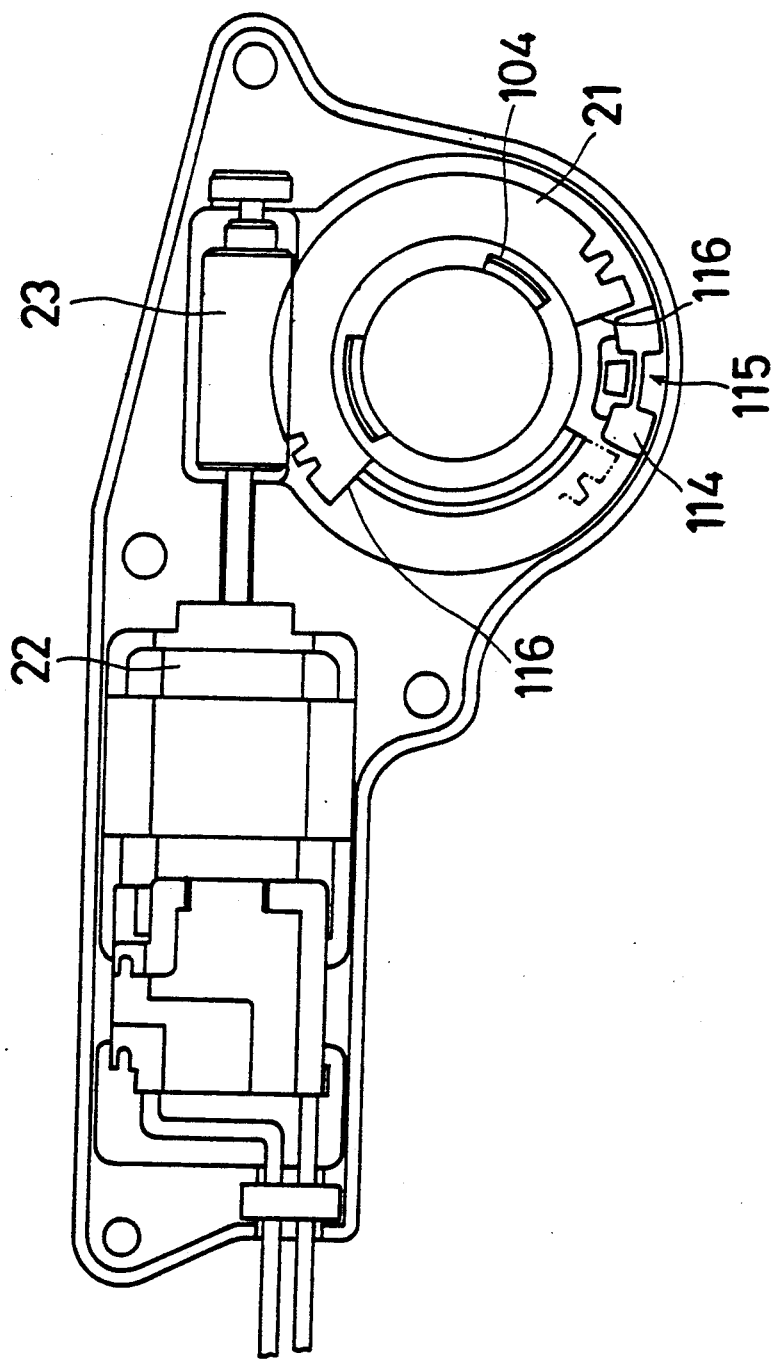
FIG. 14 is a plan view of the worm wheel shown in FIG. 12.

Excessive rotation of the worm wheel 21 must be prevented; otherwise, the wiper blades can not be properly controlled. As shown in FIG. 14, the casing includes a retainer 115 made of a rubber-like material and having opposite contacting portions 114. The worm wheel 21 has a notch of a predetermined angle where two stopper surfaces 116 are formed in confronting relation. Excessive rotation of the worm wheel 21 is prevented when the stopper surfaces 116 are brought into contact with the contacting portions 114 of the casing.

Figure 15:
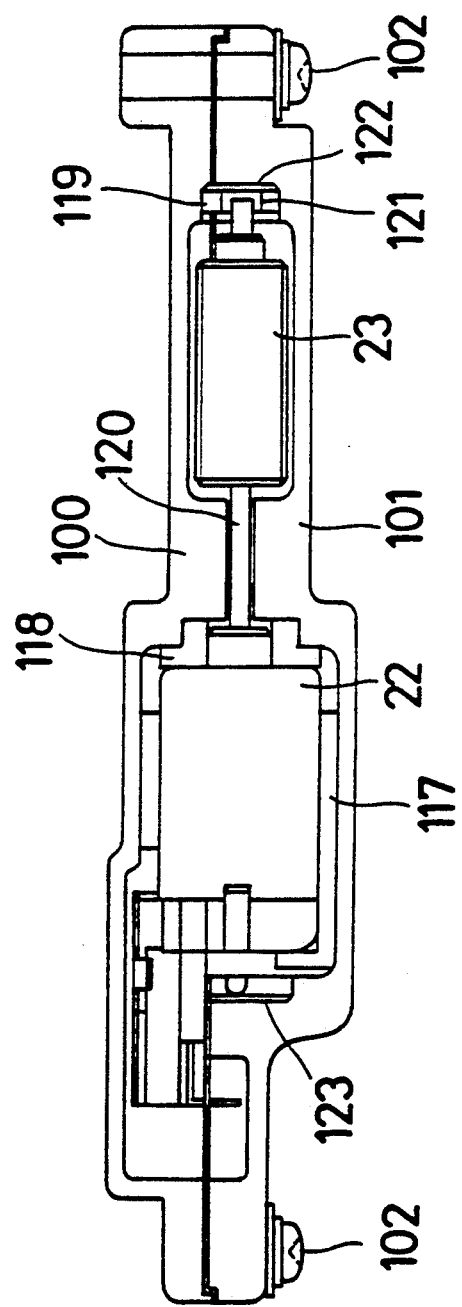
FIG. 15 is a front view of a motor and related parts of the mechanism shown in FIG. 12.
Figure 16:
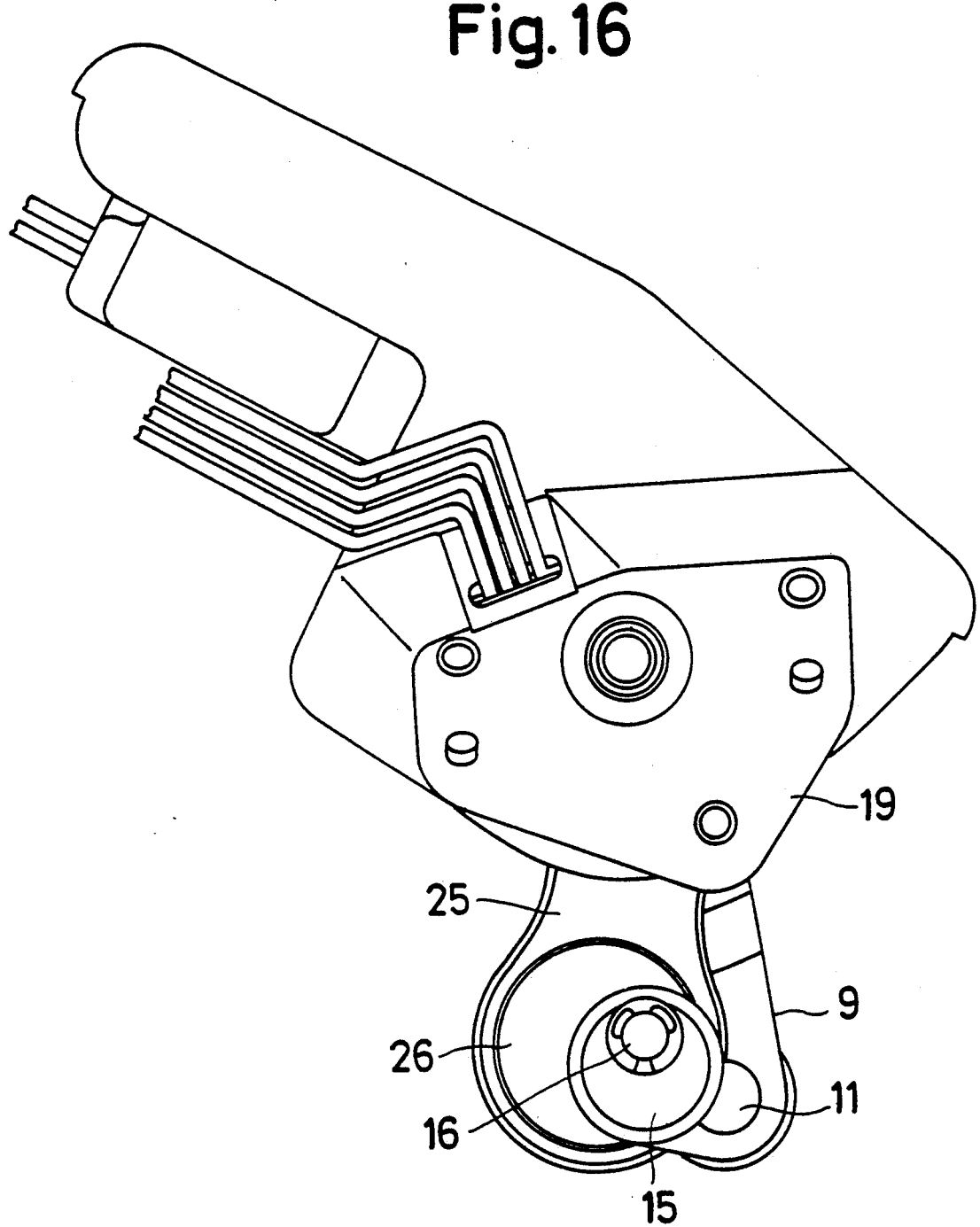
FIG. 16 is a plan view of the mechanism shown in FIG. 12.
Figure 17:
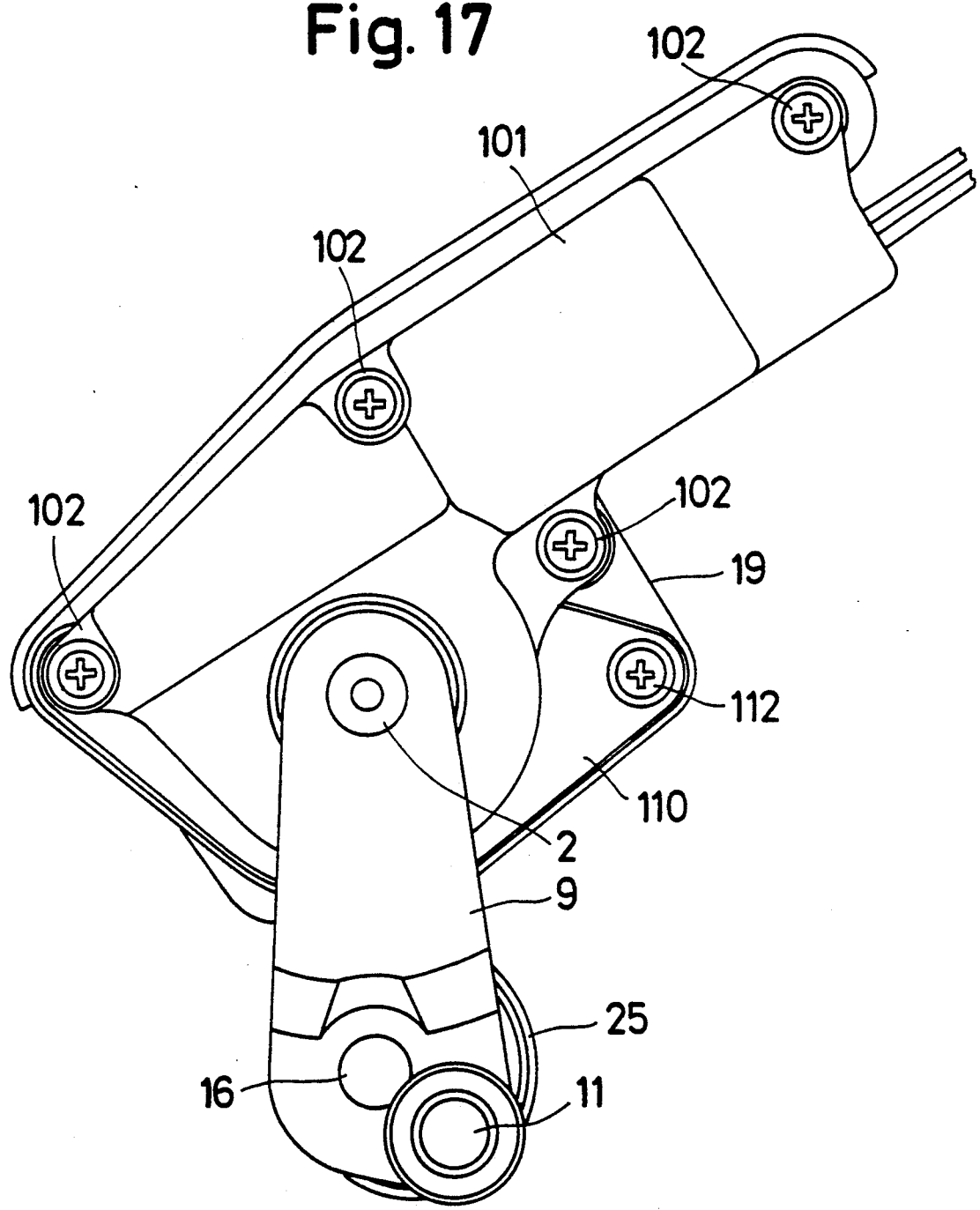
FIG. 17 is a plan view of a casing in which the motor is housed.
Figure 18:
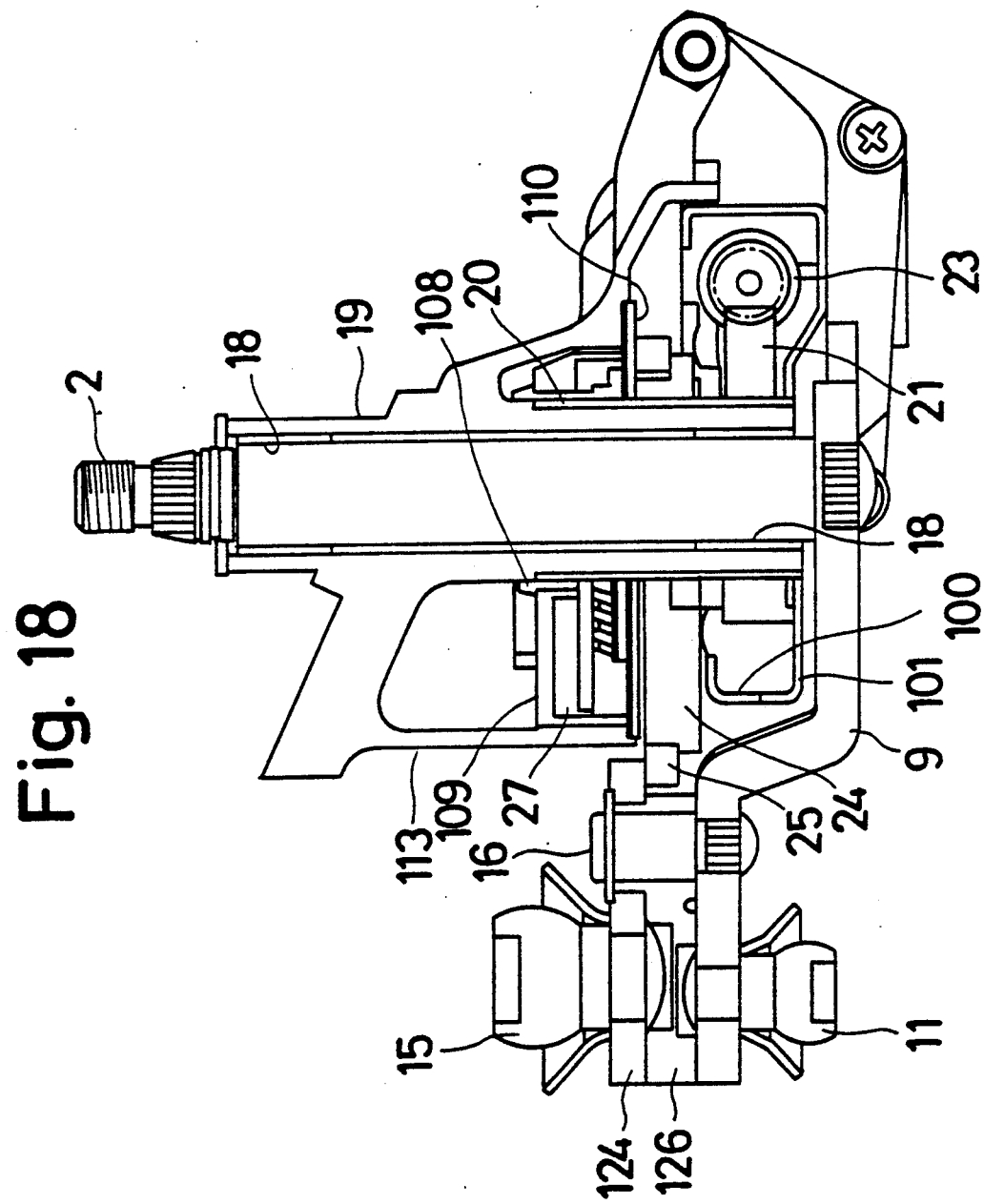
FIG. 18 is a sectional view of a mechanism for varying the operative sweep of the wiper according to a sixth embodiment of the present invention.
Figure 19:
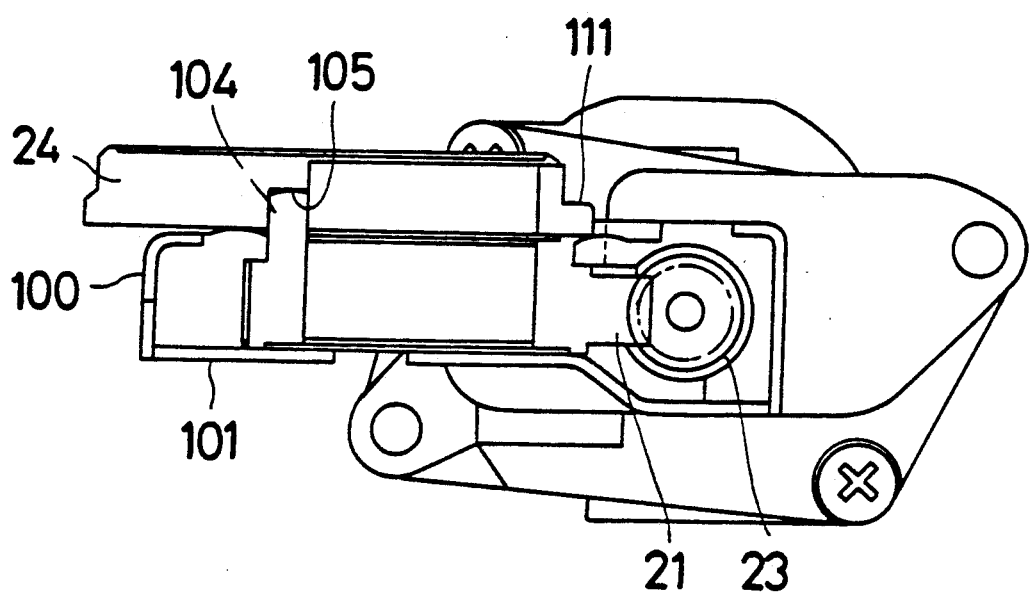
FIG. 19 is a sectional view of a worm wheel of the mechanism shown in FIG. 18.
Figure 20:
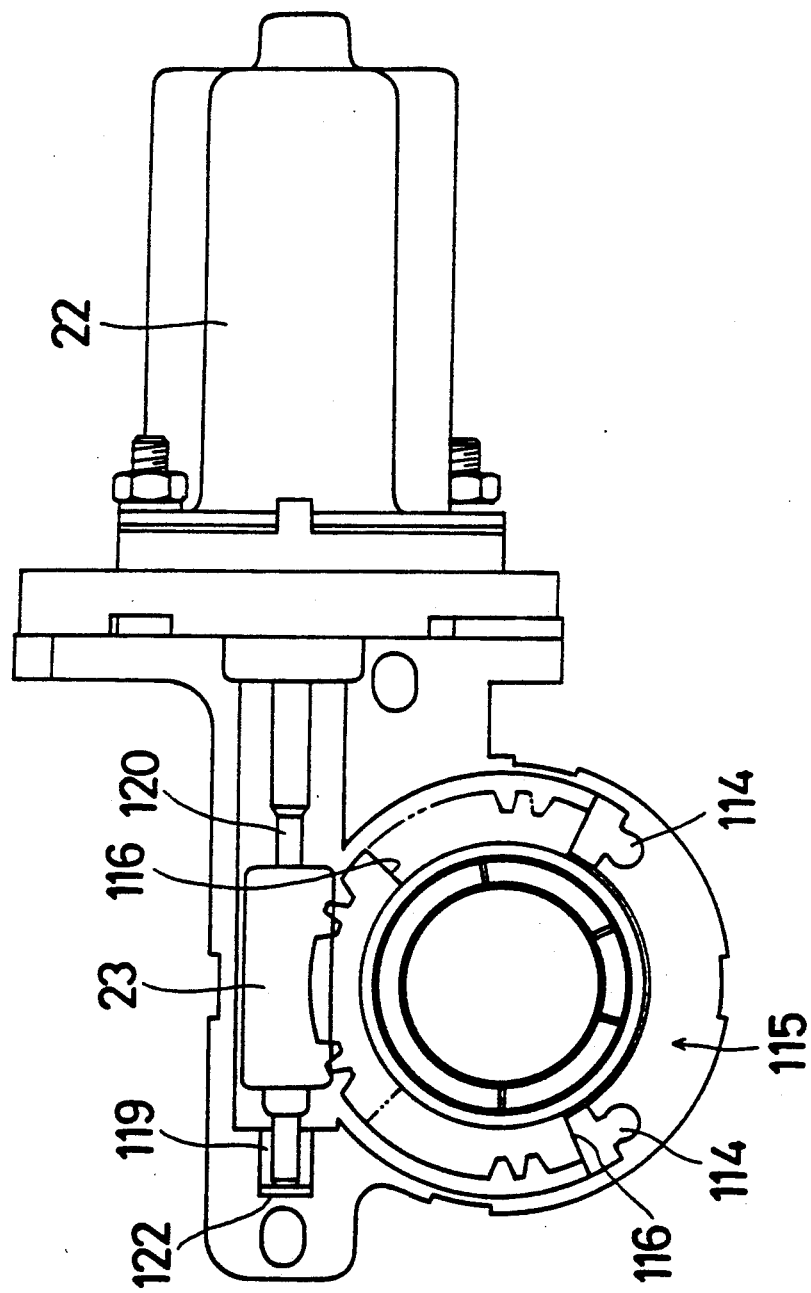
FIG. 20 is a plan view of the worm wheel shown in FIG. 18.
Figure 21:
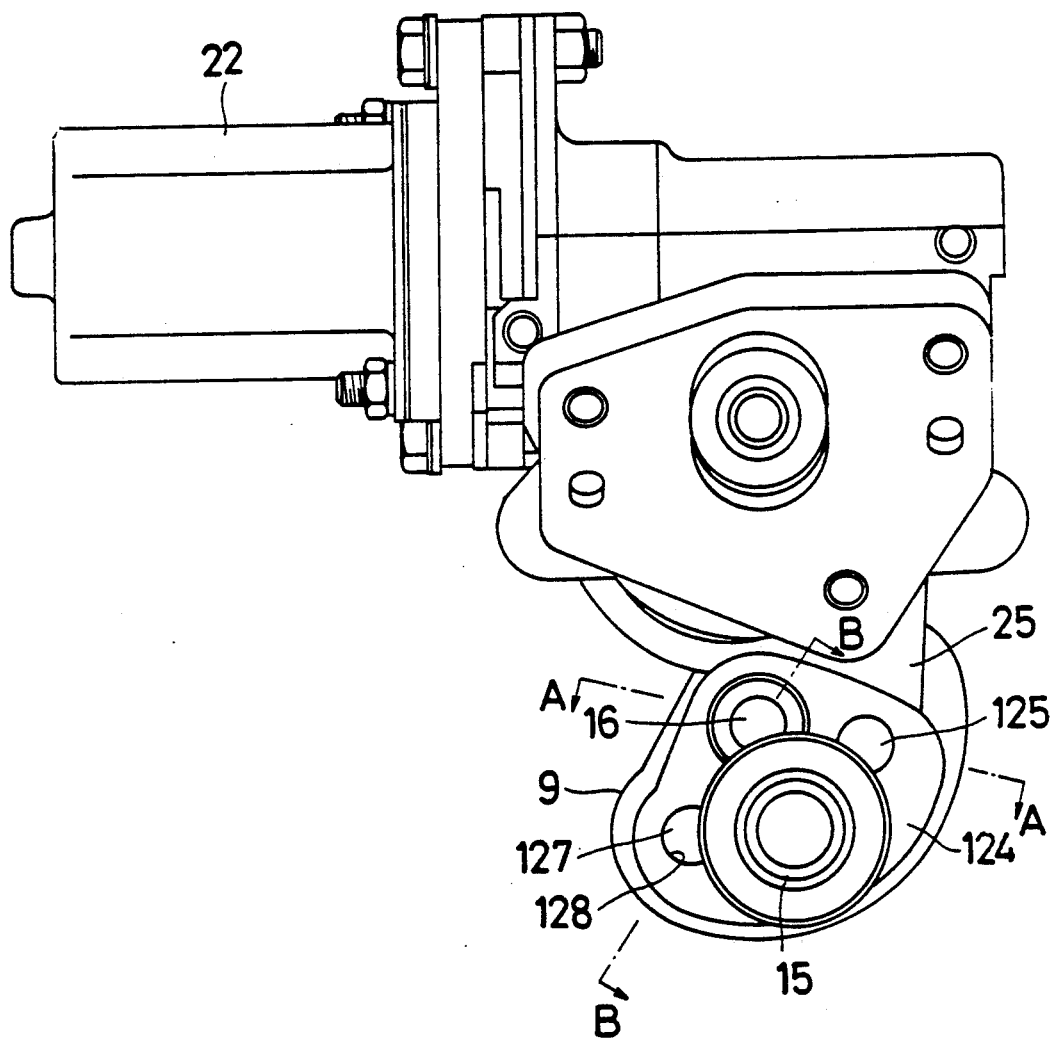
FIG. 21 is a plan view of the mechanism shown in in FIG. 18.

As shown in FIG. 15, resilient supports 117, 118 and 119 are disposed to prevent the sound of the motor 22 from being transmitted to the interior of the vehicle. The front end of a motor shaft 120 is supported in the upper and lower sections 100 and 101 through the resilient support 119 and a bearing 121. Two thrust washers 122 and 123 are used to prevent displacement of the motor shaft 120 in the direction of thrust. A resilient member may cooperate with the thrust washers 122 and 123 to reduce the sound of the motor.

FIGS. 18 through 24 show a sixth embodiment of the present invention. Like reference numerals designate like or corresponding elements or components used in the first to fifth embodiments. In the illustrated embodiment, the secondary lever 25 is connected to a second secondary plate 124 by a pin 125 and supported by the pin 15. The secondary plate 124 is rotated about the pin 16. A spacer 126 is disposed between the primary lever 9 and the second secondary plate 124 and pivotally supported by the pin 16. The spacer 126 has a projection 127 for insertion into a hole 128 of the secondary plate 124 whereby the spacer 126 and the plate 124 are coupled together.

Figure 24:
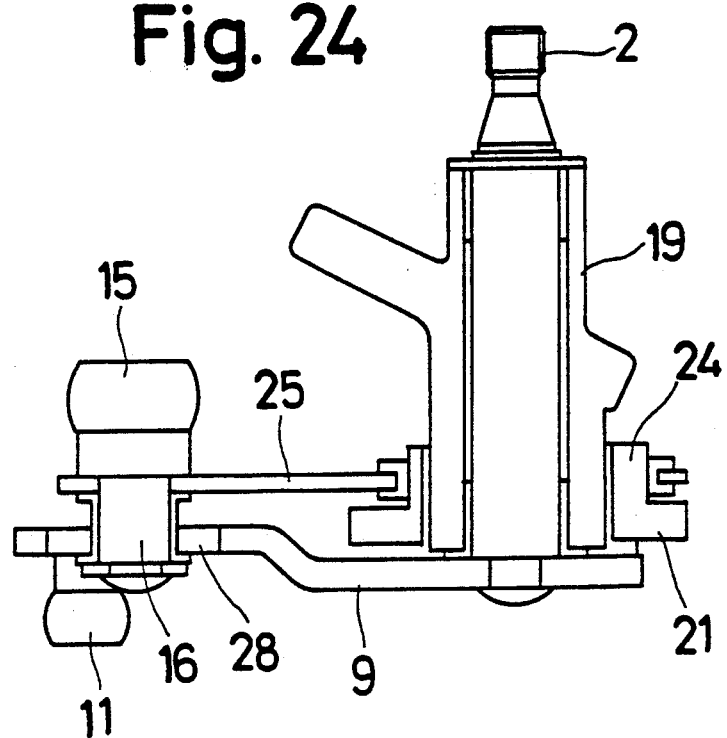
FIG. 24 is a sectional view of a mechanism for varying the operative sweep of the wiper according to a seventh embodiment of the present invention.
Figure 25:
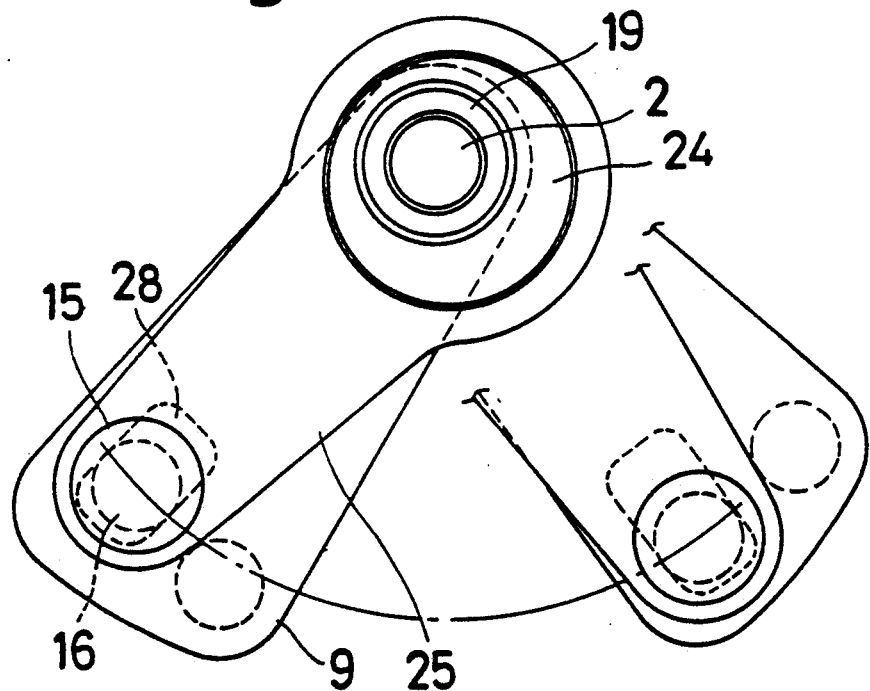
FIG. 25 is a plan view of the mechanism shown in FIG. 24.
Figure 22:
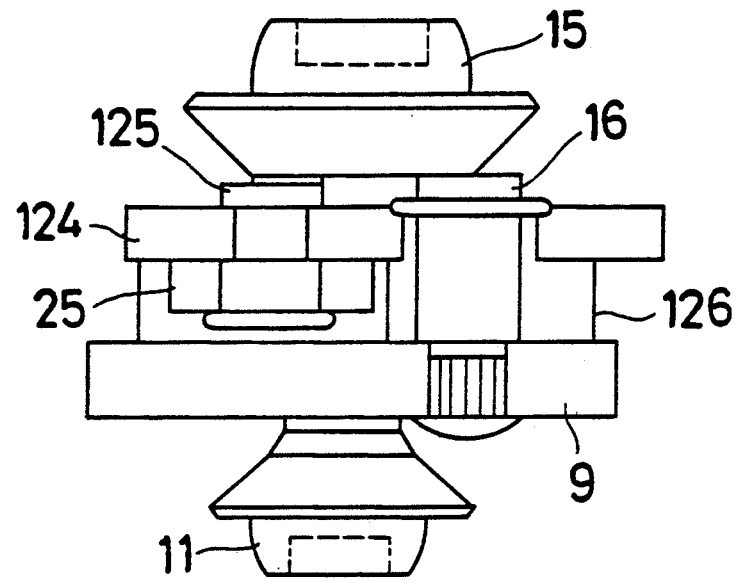
FIG. 22 is a sectional view taken along the line 22—22 of FIG. 21.
Figure 23:
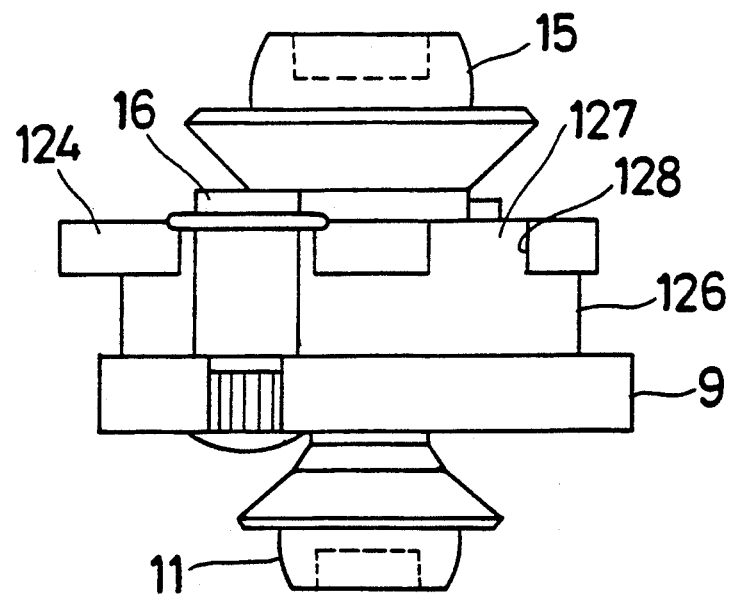
FIG. 23 is a sectional view taken along the line 23—23 of FIG. 21.

FIGS. 24 and 25 show a seventh embodiment of the present invention. The primary lever 9 has an elongated rectangular hole 28 at its one end. The first pin 16 is inserted into the elongated hole 28. When the pin 16 and the concentric wheel 21 are rotated, the cam member 24 is rotated about the pin 2. This causes the center of the cam member 24 to move toward or away from the central axis of the pin 16. In this way, the wipers are selectively oscillated through a long or short running stroke or placed in its stowed position. In the embodiments shown in FIG. 4 to 11, the first cam member 26 is rotated about the pin 16. In this particular embodiment, the pin 16 is moved along the elongated hole 28 to select the operative positions of the wiper. In other words, the elongated hole 28 acts as a cam member.

Figure 26:
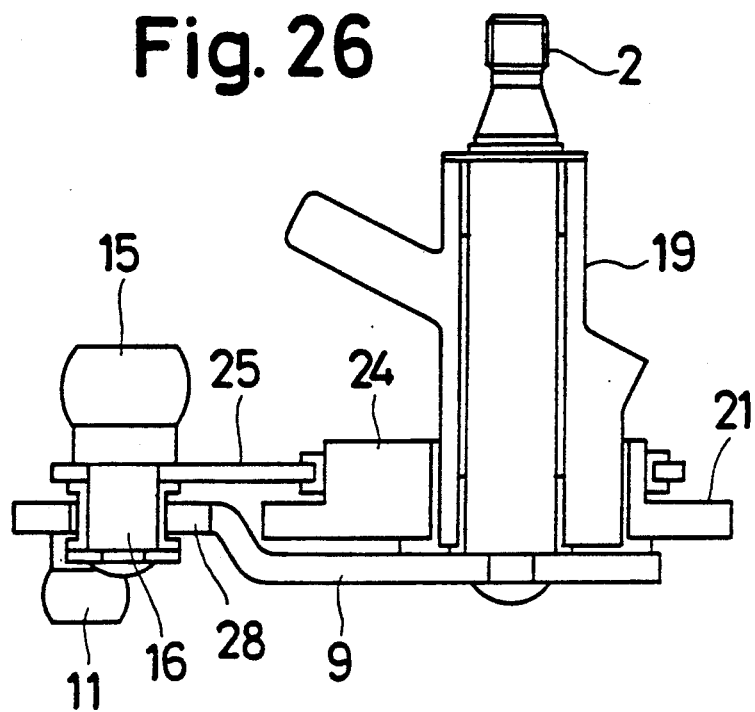
FIG. 26 is a sectional view of a mechanism for varying the operative sweep of the wiper according to an eighth embodiment of the present invention.
Figure 27:
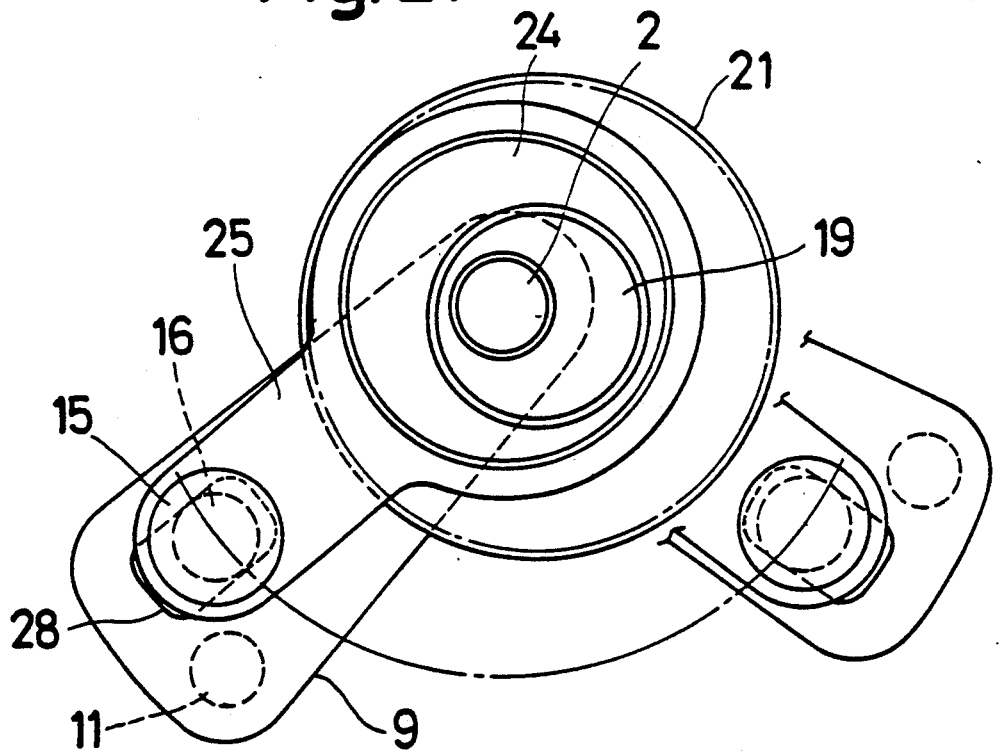
FIG. 27 is a plan view of the mechanism shown in FIG. 26.
Figure 28:
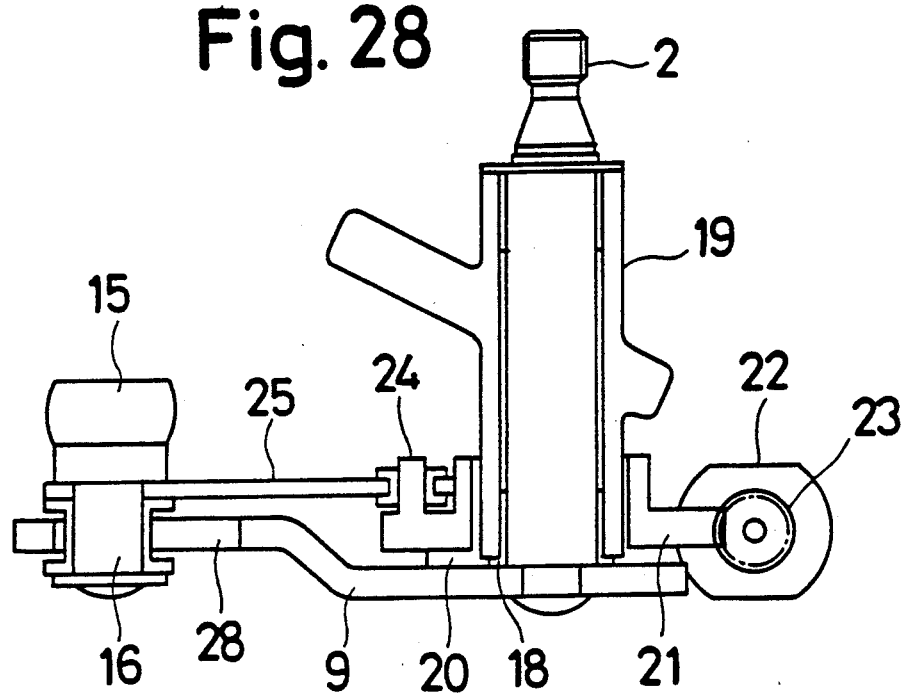
FIG. 28 is a sectional view of a mechanism for varying the operative sweep of the wiper according to a ninth embodiment of the present invention.
Figure 29:
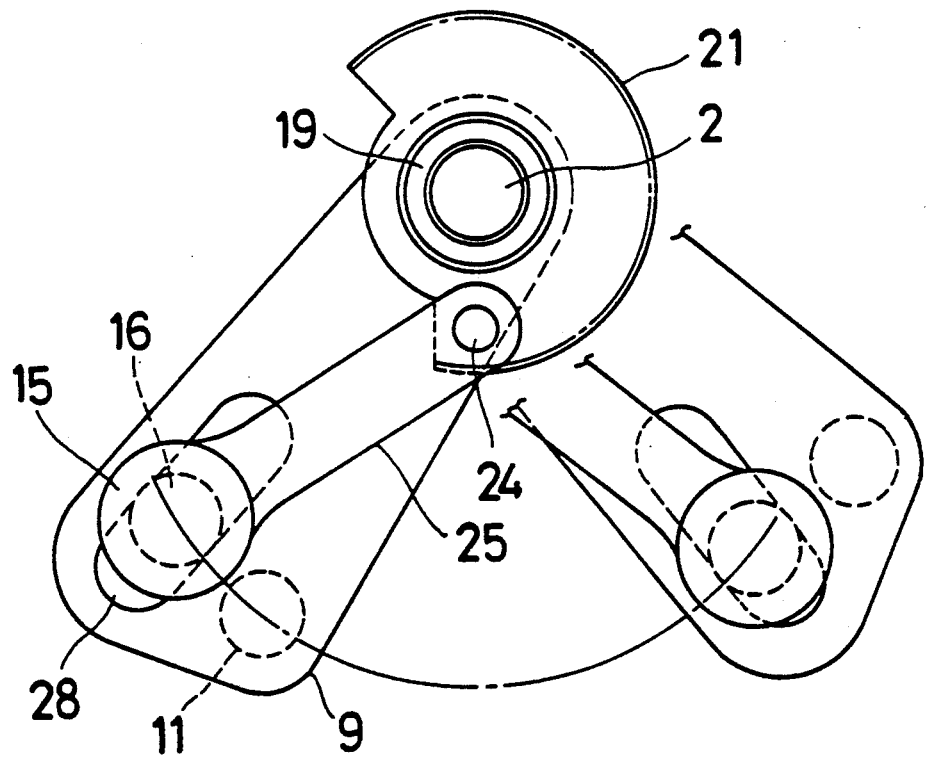
FIG. 29 is a plan view of the mechanism shown in FIG. 28.

FIGS. 26 and 27 show an eighth embodiment of the present invention. The arrangement around the pin 2 is identical to that around the pin 2 shown in FIG. 6. Likewise, the arrangement around the pin 16 is identical to that around the pin 16 shown in FIG. 24. The central axis of the pin 2, the center of the wheel 21 and the center of the cam member 24 are in an eccentric relation to each other. The pin 16 is moved along the elongated hole 28 in response to movement of the secondary lever 25 so as to select the operative positions of the wiper. The operation of each component or part is shown in FIGS. 4 and 24.

In the embodiment shown in FIGS. 24 to 29, the elongated hole 28 can accommodate errors in production as well as in assembly and ensures smooth motion of each component or part of the wiper.

Figure 30:
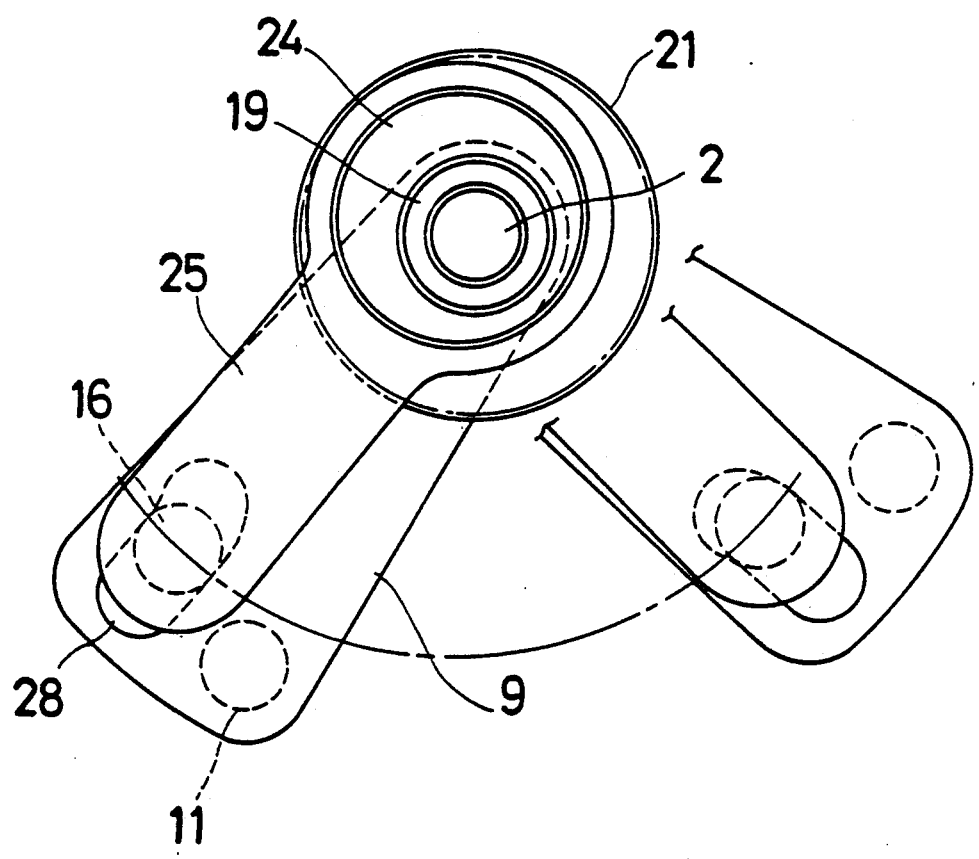
FIG. 30 is a plan view of a mechanism for varying the operative sweep of the wiper according to a tenth embodiment of the present invention.

FIG. 30 show a tenth embodiment of the present embodiment. In the illustrated embodiment, the elongated hole 28 is arcuate in shape. The pin 16 is moved along the arcuate hole 28. At this time, the pin 16 is displaced in not only a lateral direction, but also a longitudinal direction so as to properly select the operative modes of the wiper. The arrangement around the pin 2 may be identical to that shown in FIGS. 4 and 6.

In this embodiment, the pin can be moved in both the lateral and longitudinal directions. This arrangement facilitates selection of the operative modes of the wiper.

Figure 31:
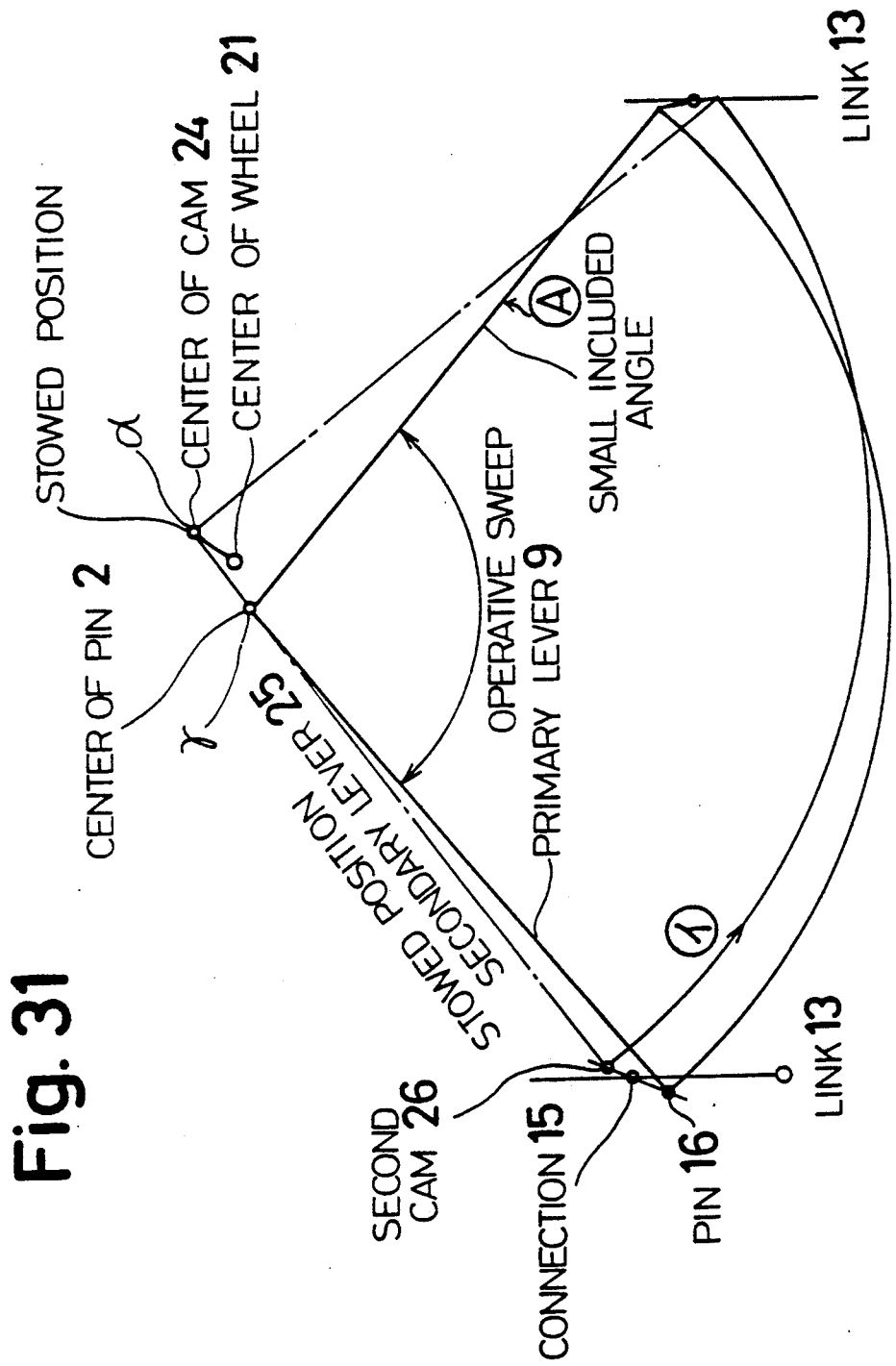
FIGS. 31 to 34 are views showing the manner in which the wiper of the present invention is operated.

With now reference to FIGS. 31 to 34, there will be explained the operative modes of the wiper shown in FIG. 6. FIG. 31 shows the relationship among the primary lever 9, the secondary lever 25 and the link 13 when the wiper is placed in its stowed position. The center of the second cam member 24 is located as at $\alpha$ when the wiper is in its stowed position.

As shown in FIG. 31, a wiper drive mechanism is rendered operative to rotate the primary lever 9 about the pin 2 (in a counterclockwise direction in FIG. 31). The primary lever 9 is moved to an outboard position through a short running stroke. While the primary lever 9 is being rotated in a clockwise direction (FIGS. 31 and 32) or returning to its inboard, the center of the cam member 24 is moved from the point $\alpha$ to the point $\beta$ by the motor 22.

When the vehicle runs at a high speed or the wiper is moved through a short running stroke at a high speed (see FIG. 33), the center of the cam member 24 is moved from the point $\beta$ to the point $\gamma$ by the motor 22 before the primary lever 9 reaches its outboard extreme or position. As a result, the wiper blade is reciprocatingly moved between the points B' and D' as shown in FIG. 2.

Figure 32:
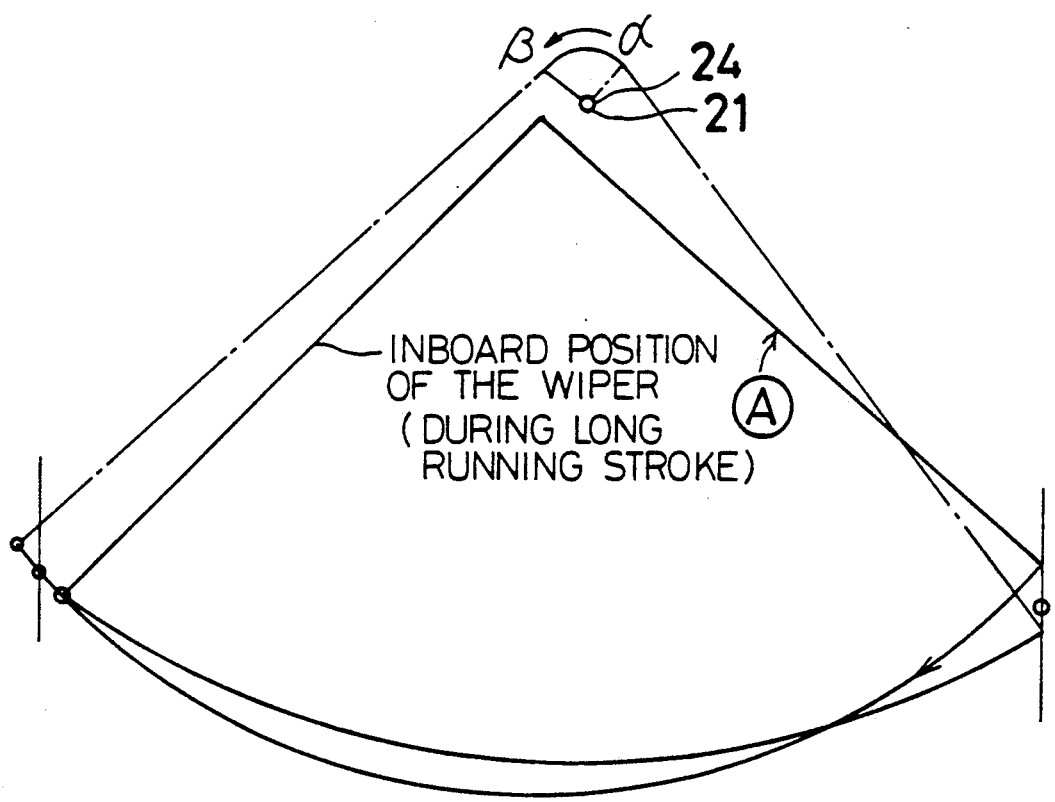
Figure 33:
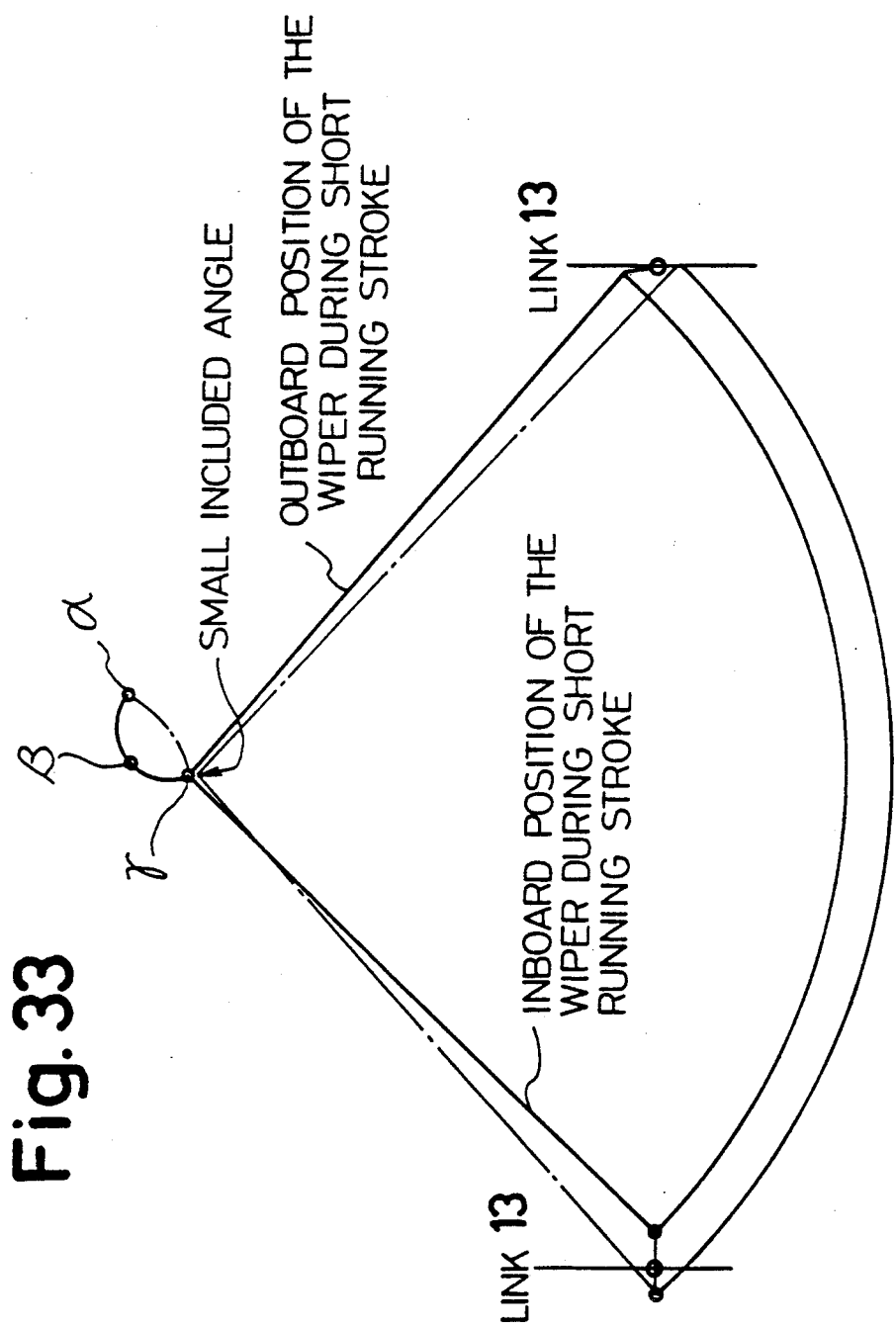

When the vehicle runs at a low speed or the wiper travels at a low speed (see FIG. 34), the primary lever is maintained in such a position as shown in FIG. 32, and the wiper blade is reciprocatingly moved between the point B' and the point C' as shown in FIG. 2.

When the primary lever 9 is moved from its stowed position, the wiper blade is always moved to its outboard position through a short running stroke. Accordingly, if the wiper is suddenly moved while the vehicle is running at a high speed, the wiper is never moved back and forth through a long running stroke, and is properly operated.

Figure 34:
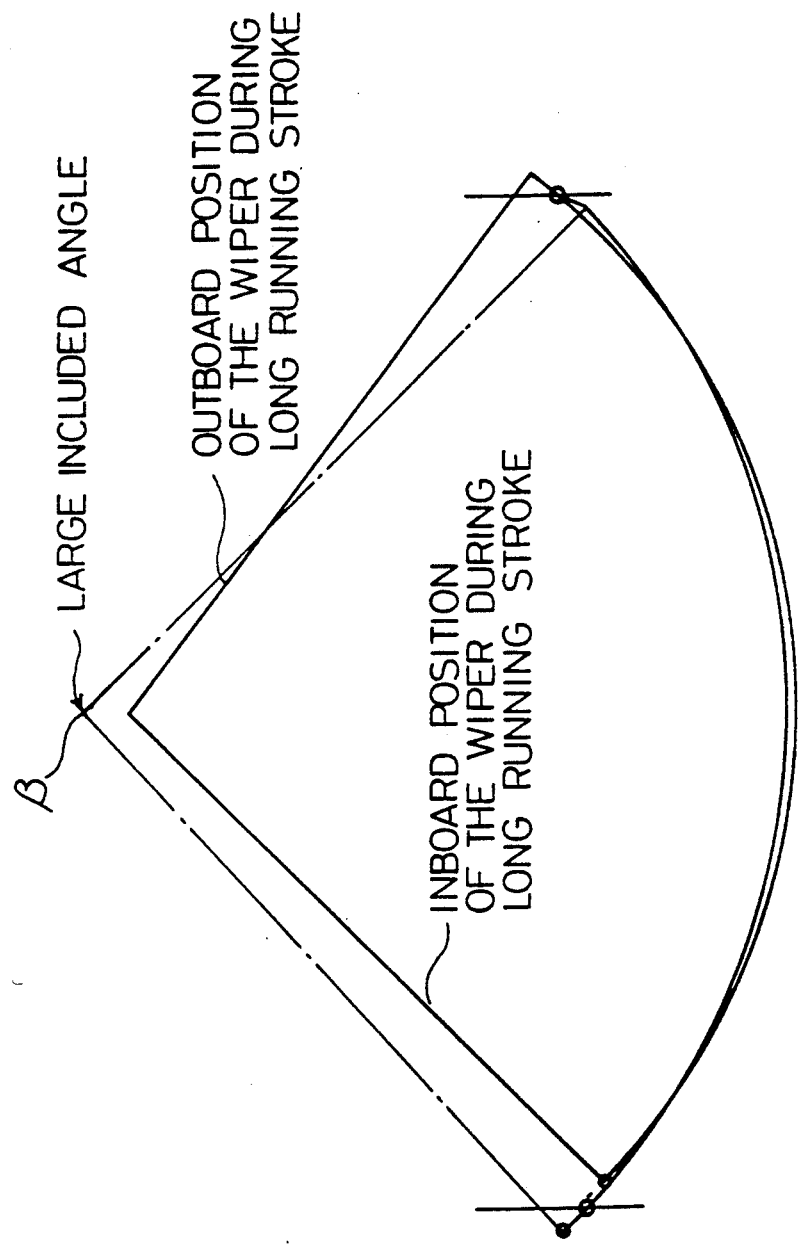
Figure 35:
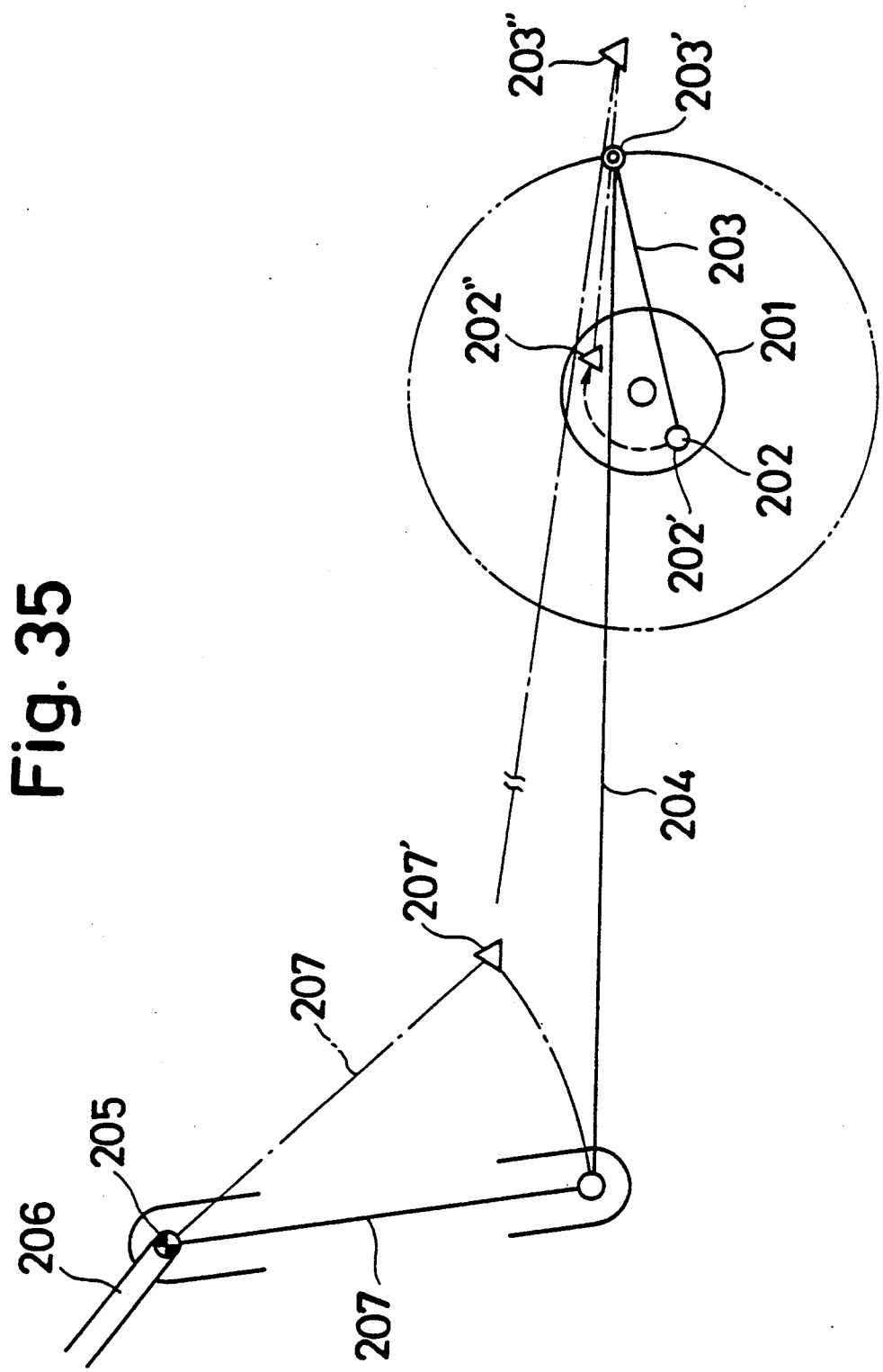
FIG. 35 is a view showing the manner in which a conventional wiper is operated.

The wiper may alternatively be operated as follows. When the wiper is moved from its stowed position, the center of the cam member 24 is moved from the point $\alpha$ to the point $\beta$ and then to its inboard position (see FIG. 32). Next, the center of the cam member 24 is moved from the point $\beta$ to the point $\gamma$. This completes the narrow operative sweep of the wiper. Energization of the motor 17 causes the link 13 to move through a short running stroke. If the center of the cam member 24 is returned from the point $\gamma$ to the point $\beta$, and the motor 17 is energized, then the wiper can be moved through a long running stroke as shown in FIG. 34. This mode of operation is effective to prevent the wiper from being moved to its stowed position directly to a position in which the wiper is moved through a long running stroke.

Advantages of the present invention is as follows:

The present invention makes it possible to use a compact motor by which the operative sweep of the wiper is changed. As this motor is supported by the stationary member, the primary lever and secondary lever can be lightly and easily moved. The wheel is placed around the pin as used to support the wiper arm. This arrangement results in a decrease in the size of the overall wiper system. The motor is fixed to the stationary member, rather than the primary lever, and as such, cutting of a harness due to contact with the motor is prevented. The worm, as meshed with the wheel, is active to immediately prevent the force of wind to be applied to the wiper and thus the wiper to be contacted with the piller. In addition, wires for the position sensor are arranged on the stationary member so as to improve the safety. All the components or part are successively assembled to the stationary member. This facilitates the assembly of the wiper, improves the accuracy of the assemblage and makes it possible to provide a noiseless wiper.

In the present invention, the motor and the wheel gear are both housed in the casing. When the casing is fixedly mounted to the stationary member, the wheel gear is brought into engagement with the second cam member so as to transmit a torque from the motor to the second cam member. Since the gear assembly is previously housed in the casing, the output shaft of the motor can be aligned with the axis of the gear portion, and the gear portion is properly meshed with the wheel gear.

While there have been described what are at present considered to be the preferred embodiments of the invention, it will be obvious to those skilled in the art that various modifications and changes may be made therein without departing from the invention, and it is aimed, therefore, in the appended claims to cover all such modifications and changes as fall within the true spirit and scope of the invention.

What is claimed is:

1. A windshield wiper including: a first pin having a central axis and connected to a drive mechanism: a primary lever supported by said first pin; a second pin having a central axis and mounted to said primary lever; a wiper arm fixedly mounted to said second pin; said primary lever being pivoted about said second axis pin by said drive mechanism to cause reciprocating motion of said wiper arm in an arcuate path; a first cam member having a center and rotatable about said first pin, said first cam member connecting the drive mechanism to said first pin, said first cam member defining an operating point at which the drive mechanism imparts force to said primary lever; a second cam member rotatable about said second pin; and a secondary lever for connecting said first cam member and said second cam member together such that movement imparted to said second cam member can be transmitted to said first cam member; said second cam member being so rotated as to allow the center of said first cam member to move relative to the central axis of said first pin;

a stationary member;

a wheel gear for rotating said second cam member through a predetermined angle, said second cam member being rotatably supported by said stationary member;

a gear portion meshed with said wheel gear;

a motor for rotating said gear portion thereby moving the operating point to change the arcuate path of the wiper arm; and a casing for housing said wheel gear and said gear portion therein, said casing being fixed to said stationary member.

* * * * *

UNITED STATES PATENT AND TRADEMARK OFFICE
CERTIFICATE OF CORRECTION

PATENT NO. : 5,090,081
DATED : February 25, 1992
INVENTOR(S) : Tokihiko YAMAMOTO et al.

It is certified that error appears in the above-identified patent and that said Letters Patent is hereby corrected as shown below:

Claim 1, column 9, line 17, change "axis pin" to --pin axis--.

Signed and Sealed this

First Day of June, 1993

Attest:

MICHAEL K. KIRK

Attesting Officer

Acting Commissioner of Patents and Trademarks